(12) United States Patent
Preta et al.

(10) Patent No.: US 9,386,658 B2
(45) Date of Patent: Jul. 5, 2016

(54) SMART SIGNAL LIGHT

(71) Applicants: Hans C Preta, Tampa, FL (US); Isaiah Monty Simmons, Lenoir, NC (US); William Monty Simmons, Lenoir, NC (US); Dominic Joseph Preta, Tampa, FL (US); Joseph Frank Preta, Tampa, FL (US); Roger Allcorn, Newcasatle (GB)

(72) Inventors: Hans C Preta, Tampa, FL (US); Isaiah Monty Simmons, Lenoir, NC (US); William Monty Simmons, Lenoir, NC (US); Dominic Joseph Preta, Tampa, FL (US); Joseph Frank Preta, Tampa, FL (US); Roger Allcorn, Newcasatle (GB)

(*) Notice: Subject to any disclaimer, the term of this patent is extended or adjusted under 35 U.S.C. 154(b) by 96 days.

(21) Appl. No.: 14/229,825

(22) Filed: Mar. 28, 2014

(65) Prior Publication Data

US 2015/0279169 A1    Oct. 1, 2015
US 2016/0098906 A9    Apr. 7, 2016

Related U.S. Application Data

(63) Continuation-in-part of application No. 13/271,205, filed on Oct. 11, 2011, now Pat. No. 8,770,771, which is a continuation-in-part of application No. 12/269,881, filed on Nov. 12, 2008, now Pat. No. 8,061,879.

(60) Provisional application No. 60/987,074, filed on Nov. 11, 2007, provisional application No. 61/806,050, filed on Mar. 28, 2013.

(51) Int. Cl.
*B60Q 1/00* (2006.01)
*H05B 33/08* (2006.01)
*H05B 37/00* (2006.01)
*F21K 99/00* (2010.01)
*H05B 37/02* (2006.01)

(52) U.S. Cl.
CPC .............. *H05B 37/00* (2013.01); *B60Q 1/0023* (2013.01); *H05B 33/0845* (2013.01); *H05B 37/0227* (2013.01); *F21K 9/10* (2013.01)

(58) Field of Classification Search
CPC .... A41D 13/01; B60Q 1/2611; B60Q 1/2615; B60Q 1/2673; B60Q 1/2696; B60Q 1/442; B60Q 1/444; B60Q 1/52; B60Q 1/54; B60Q 7/00; B60Q 1/0023; B60Q 2900/30; B60Q 11/005; B60Q 1/305; B60Q 1/44; B60R 21/01; F21S 10/02; F21S 10/06; F21S 4/008; F21S 9/022; F21V 23/0407; F21V 23/0492; F21W 2101/02; F21Y 2101/02; F21Y 2111/005; G08B 5/004; G09F 13/18; G09F 13/22; G09F 19/00; G09F 2021/023; G09F 21/02; G09G 3/16; H05B 37/0272; H05B 33/0854; H05B 37/00; F21K 9/10; F21L 4/027
USPC ................. 340/468, 463, 464, 471, 479, 669, 340/815.45, 438, 431, 540, 670, 6.1; 455/128
See application file for complete search history.

(56) References Cited

U.S. PATENT DOCUMENTS 3,725,569 A * 4/1973 Ashworth .............. H04N 1/488
                                                    348/E5.05
4,837,554 A * 6/1989 Gianforcaro ........... B60Q 1/442
                                                    340/464

(Continued)

*Primary Examiner* — Fekadeselassie Girma
(74) *Attorney, Agent, or Firm* — Monty Simmons; Simmons Patents

(57) ABSTRACT

Disclosed is a smart signal generator for generating a signal representing a motion. The device includes a processing device associated with a motion sensor and a signal generator and a power source. The signal generator is a light source. When the motion sensor generates data indicating the smart signal generator is slowing down, the processing device activates the signal generator which generates a motion signal. One embodiment of a motion signal is a red light.

20 Claims, 16 Drawing Sheets

(56) References Cited

U.S. PATENT DOCUMENTS

| | | | | |
|---|---|---|---|---|
| 5,642,094 A * | 6/1997 | Marcella | ................ | B60Q 1/444 340/463 |
| 5,893,626 A * | 4/1999 | Poling | ..................... | B62J 6/04 362/231 |
| 6,999,923 B1 * | 2/2006 | Ablondi | .................. | G10L 15/20 704/231 |
| 8,405,498 B1 * | 3/2013 | Smith | ..................... | B60R 21/01 340/463 |
| 2001/0015123 A1 * | 8/2001 | Nishitani | ........... | A63B 71/0686 84/615 |
| 2004/0218382 A1 * | 11/2004 | Saban | .................... | G09F 19/00 362/157 |
| 2005/0012602 A1 * | 1/2005 | Knoop | ................... | B60Q 9/008 340/435 |
| 2005/0057941 A1 * | 3/2005 | Pederson | ............. | B60Q 1/2611 362/542 |
| 2006/0138329 A1 * | 6/2006 | Wu | ...................... | G01D 11/245 250/342 |
| 2009/0041313 A1 * | 2/2009 | Brown | ................... | H04M 1/05 382/124 |
| 2010/0251453 A1 * | 10/2010 | Chen | ................... | B60Q 1/2673 2/69 |
| 2011/0309772 A1 * | 12/2011 | Forgey | ................... | G09F 13/18 315/308 |
| 2015/0076781 A1 * | 3/2015 | O'Dea | ................. | A63C 17/017 280/87.042 |

* cited by examiner

SMART SIGNAL LIGHT

CLAIM TO PRIORITY

This application is a continuation in part to U.S. application Ser. No. 13/271,205 which is a continuation in part to U.S. Pat. No. 8,011,593, which stems from a non-provisional application Ser. No. 12/050,141 filed on Mar. 17, 2008 which further claims priority to provisional application 60/895,008 filed Mar. 15, 2007, and is further a continuation in part to U.S. non-provisional application Ser. No. 12/269,881 filed on Nov. 12, 2008 which further claims priority to provisional application 60/987,074 filed on Nov. 11, 2007, the entire contents of all such references of which are incorporated herein by this reference for all that they disclose for all purposes.

TECHNICAL FIELD OF THE INVENTION

Embodiments of the present invention relate to smart signal light apparatus and method for generating motion signals.

BACKGROUND

There are a multitude of prior art emergency lighting systems. Such systems typically include a battery-backed lighting device that comes on automatically when a building experiences a power outage. Such emergency lights are standard in new commercial and high occupancy residential buildings, such as college dormitories and most building codes require that they be installed in older buildings as well. By the nature of such devices, emergency lights are designed to come on when the power goes out. The Applicants have found no such prior art emergency lighting systems that are designed to provide a lighting feature when the power is on and to continue to provide emergency lighting when the power is out.

Similarly, there are many prior art flash light devices that are configured to be electrically associated with and charged by the power system of a building such as a house. However, such prior art flashlights are not also configured to be electrically associated with a lighting fixture (such as the ones typically found in a home) to provide a normal lighting function when the fixture is supplying power to such prior art flashlights and to provide an emergency lighting function when the fixture is not supplying power to such prior art flashlights. Nor can such prior art lighting devices be associated with electronic modules and systems such as cell phones and alarm systems respectively.

The inventions disclosed in this document address such shortcomings by teaching a smart light bulb device that may be mechanically and electrically associated with and be powered by a typical lighting fixture found in a building or home, has low power consumption, can be remotely controlled, and provides a typical lighting function when the lighting fixture is providing power to the device. Additional configurations further provide an emergency lighting feature when the power is out (i.e. the lighting fixture is not supplying power) and the device may further be removed from the lighting fixture and used as a typical flashlight. The device may further be electrically and remotely associated with devices such as cell phones and systems such as alarm systems to provide emergency services.

Other embodiment relate to smart lights configurable to perform a variety of tasks including lighting a path, lighting a room, providing emergency lighting, lighting associated with an alarm system, and for carrying around to perform the function of a traditional flashlight.

SUMMARY

Some of the objects and advantages of the invention will now be set forth in the following description, while other objects and advantages of the invention may be obvious from the description, or may be learned through practice of the invention.

Broadly speaking, a general object of the present invention is to provide an apparatus and method for providing an independent portable motion signal. For one embodiment the device comprises a housing with a processing device electrically associated with a motion sensor such as an accelerometer. The processing device is further electrically associated with a signaling element such as a light generator. When the motion sensor indicates that the apparatus is slowing down, the processing activates the light source and it emits a red light. The housing can be configured to be associated with the clothing associated with a user. A bike rider could wear the apparatus to signal others that the biker is slowing down.

A further general object of the invention is to provide a general object of the present invention is to provide an apparatus and method for providing an independent portable motion signal where the apparatus generates any one of a plurality of possible signals depending on the motion being detected.

Additional objects and advantages of the present invention are set forth in the detailed description herein or will be apparent to those skilled in the art upon reviewing the detailed description. It should be further appreciated that modifications and variations to the specifically illustrated, referenced, and discussed steps, or features hereof may be practiced in various uses and embodiments of this invention without departing from the spirit and scope thereof, by virtue of the present reference thereto. Such variations may include, but are not limited to, substitution of equivalent steps, referenced or discussed, and the functional, operational, or positional reversal of various features, steps, parts, or the like. Still further, it is to be understood that different embodiments, as well as different presently preferred embodiments, of this invention may include various combinations or configurations of presently disclosed features or elements, or their equivalents (including combinations of features or parts or configurations thereof not expressly shown in the figures or stated in the detailed description).

Those of ordinary skill in the art will better appreciate the features and aspects of such embodiments, and others, upon review of the remainder of the specification.

BRIEF DESCRIPTION OF THE DRAWINGS

A full and enabling description of the present subject matter, including the best mode thereof, directed to one of ordinary skill in the art, is set forth in the specification, which makes reference to the appended figures, in which:

FIG. 15 is a block diagram representation of a delay circuit with main power on.

Figure 1:
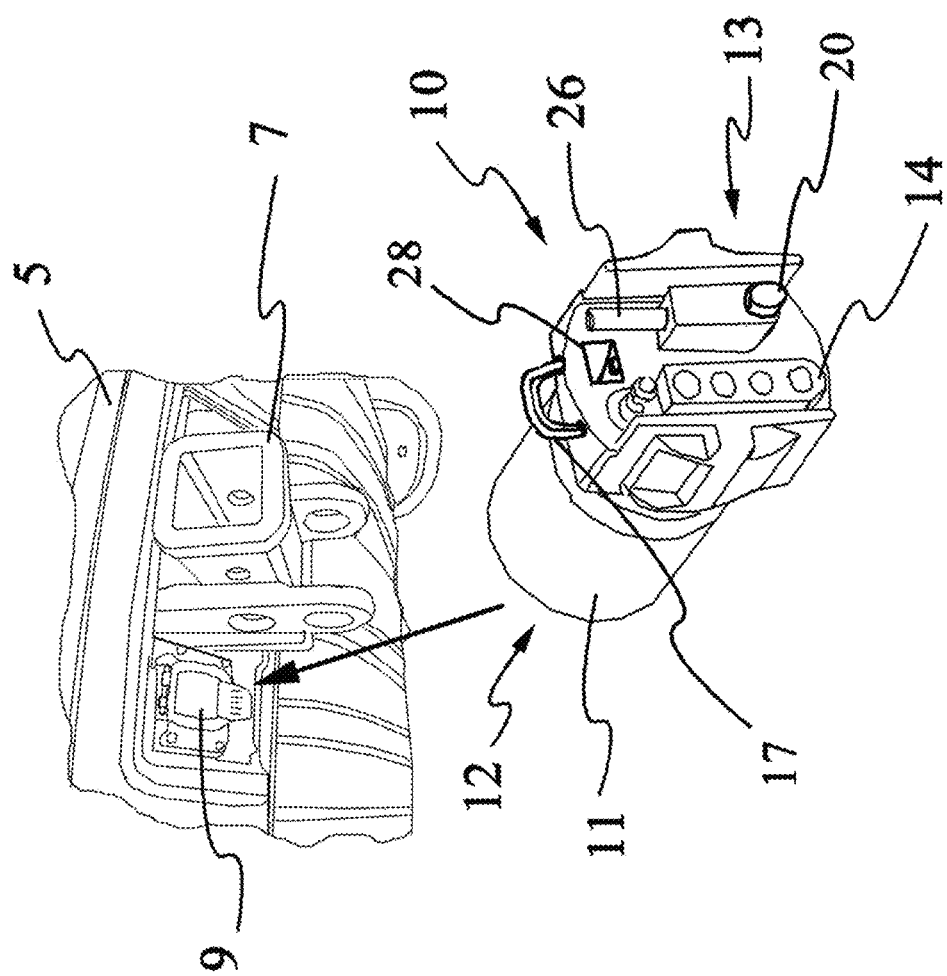
FIG. 1 is a side perspective view on one exemplary smart light controller for vehicle lighting systems.

Repeat use of reference characters throughout the present specification and appended drawings is intended to represent the same or analogous features or elements of the present technology.

DETAILED DESCRIPTION

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention covers such modifications and variations as come within the scope of the appended claims and their equivalents. Other objects, features, and aspects of the present invention are disclosed in or may be determined from the following detailed description. Repeat use of reference characters is intended to represent same or analogous features, elements or steps. It is to be understood by one of ordinary skill in the art that the present discussion is a description of exemplary embodiments only, and is not intended as limiting the broader aspects of the present invention.

For the purposes of this document two or more items are "associated" by bringing them together or into relationship with each other in any number of ways including a direct or indirect physical connection. Similarly, two or more items are "electrically associated" by bringing them together or into relationship with each other in any number of ways including: (a) a direct, indirect or inductive communication connection, and (b) a direct/indirect or inductive power connection. In addition, while a drawing or image may depict a particular electrical association as a single line, such a connection may represent a plurality of wired connections or cables comprising multiple conductors as required for the application of interest.

It will be appreciated that while this document contains headers, such headers are place markers only and are not intended to form a part of this document or affect its construction.

With regard to the smart light with battery backup embodiments disclosed in this document, such embodiments relate to lighting devices configured for being associated with a typical household light interface such as a light socket (Edison socket). It will be appreciated that such technology may be used in any number of environments including industrial environments and storage areas and any place that comprises an interface configured for being associated with lighting devices.

Referring now to FIG. 1, a side perspective view of one exemplary embodiment of a smart light controller configured for transmitting light command signals is presented. For the presently preferred embodiment, smart light controller (10) comprises a housing (11) defining a first end (12) and a second end (13). First end (12) is preferably configured for being associated with a light-command generator (vehicle 5) via socket (9) comprising light-command signal paths (not shown). For the embodiment depicted in FIG. 1, the light command-generator is the electrical system of vehicle 5 and the signal paths are wires that convey the traditional signals associated with a vehicle to socket (9). Such traditional signals include stop signals, turn signals, and running like signals. Restated, housing (11) defines a male plug suitable for being associated with a female socket comprising light-command signal paths where the female socket is mechanically associated with a vehicle and electrically associated with the electrical system of such vehicle.

Similarly, housing (11) may be a first connector suitable for being releasably associated with a second connector comprising said light-command signal paths associated with said light-command generator. For example, housing (11) may define a box configured for housing controller (10) and further comprising an attachment interface configured for being associated with a vehicle. One possible attachment interface is a magnetic interface configured for being magnetically associated with the metal surface of a vehicle. The first connector is mechanically and electrically associated with the controller (10) via a connector defined by housing (11) and configured to receive such first connector. The first connector is further electrically associated with said second connector comprising the light-command signal paths associated with said light command-generator.

As depicted in FIG. 1, smart light controller (10) may further comprise a security-interface associated with said housing (11). One exemplary example of a security interface is locking loop (17). Locking loop (17) is configured for receiving a cable that is secured to trailer hitch (7).

Figure 2:
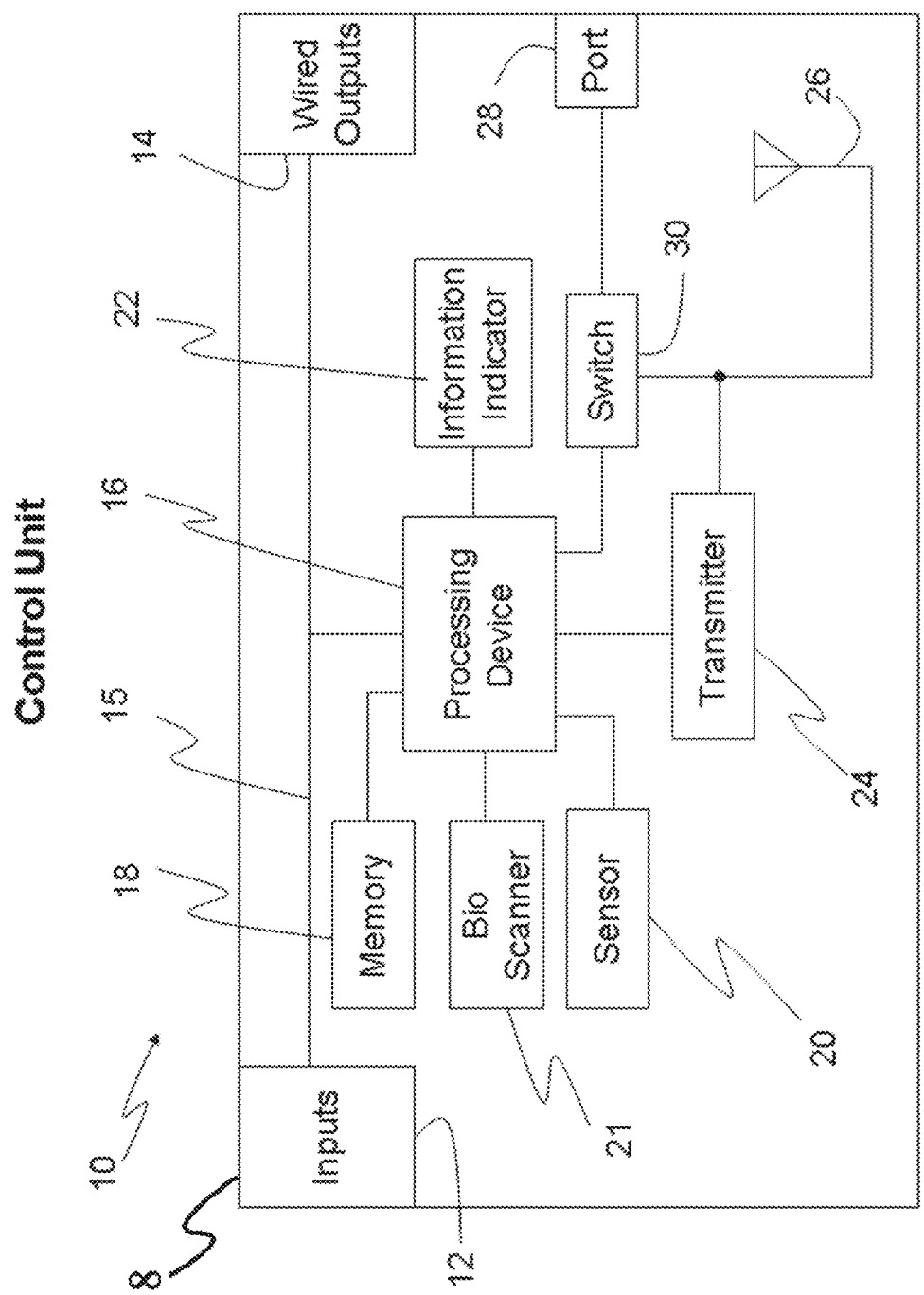
FIG. 2 is one exemplary block diagram representation of a controller.

Referring now to FIG. 1 and FIG. 2, one exemplary embodiment of a controller (8) disposed between the first end (12) and the second end (13) is presented. Controller (8) comprises processing device (16) associated with a memory (18) and a transmitter (24). It should be appreciated that while memory (18) and transmitter (24) are depicted in FIG. 2 as discrete components, embodiments of the invention where memory (18) and transmitter (24) are integrated into a single processor chip fall within the scope of the invention. Transmitter (24) is further electrically associated antenna (26).

Memory (18) may be any type of memory and may be used for storing any digitally encoded information including programs and data (e.g. sensor data). Memory (18) may be a discrete memory module electrically associated with processing device (16).

Processing device (16) is further electrically associated with input (12) configured for electrically associating processing device (16) with the light-command signal paths associated with socket (9). One of ordinary skill in the art will appreciate that such a configuration allows controller (8) to receive signals from the light-command generator. Upon receiving signals from the light command generator, processing device (16) configures the appropriate corresponding RF command signal. Such RF command signal is then transmitted to remote devices such as smart lights. In addition to providing an RF output, smart light controller may further provide a wired output (14). Wired output (14) is electrically associated with the wired input (12) and is configured to provide a "pass-through-connector" function. Wired output (14) may be the same configuration as socket (9) or wired output (14) may use other socket configurations thereby providing an adapter function.

For some embodiments of the invention, controller (8) may further comprise an information indicator (22) electrically associated with processing device (16). Information indicator (22) is configured for providing information to a user such as status information. Exemplary embodiments of information indicator (22) include LED lights or a display such as an LCD display. Such information indicator (22) may be configured to provide a connection status indicating that smart light controller (10) has been electrically associated with a properly wired socket. Information indicator (22) may further be configured to indicate the need for providing a bio-sample as described below.

For some embodiments of the invention, a Port (28) may be provided. Port (28) is preferably configured with one or more connections for providing at least one of data input and data output functions. For example, port (28) may provide a connection point for an external antenna. Additionally, port (28) may comprise a communication connection to processing device (16) for transferring data between processing device (16) and an external device electrically associated with port (28). Port (28) may be configured to perform a plurality of communication functions including: (a) upgrading firmware; (2) transferring data to processing device 16 that is (i) incorporated into a data-signal and transmitted via antenna (26), (ii) stored in a memory, and (iii) transferred to wired output (14).

Still referring to FIG. 2, controller (8) may further comprise a sensor or array of sensors (20). Senor (20) may be any number of sensors (or only one sensor) configured for detecting and generating a signal relatable to an environmental parameter. Generally speaking, a sensor may collect data and perform at least one of the following functions: (a) transfer the data to processing device (16) or a device selected by processing device (16); (b) store the data in a local memory associated with the sensor; (c) process the data and generate a sensor-signal that is transferred to processing device (16). Possible sensor technologies include temperature, visual (image), audio, continuity, power quality, proximity, and RF sensors.

For one embodiment, sensor (20) includes an image sensor configured to capture image data of the smart light controller (10) environment. For example, where smart light controller (10) is a trailer light control unit, image sensor (20) may be configured to capture image data of the connection between a trailer and a trailer hitch associated with hitch receiver (7). Such data could be stored in memory (18) and/or transmitted to a remote device. Additionally, some trailers are difficult to see from the cab of the towing vehicle making backing up even more difficult than normal. In such circumstances, image sensor (20) may be used as an aid when backing the trailer.

For one embodiment, sensor (20) includes a temperature sensor for capturing temperature data which may be stored in memory (18) and/or transmitted to a remote device.

For yet another embodiment, sensor (20) includes a continuity sensor for determining the connection quality between two electrical connections. Such a configuration may particularly useful in verifying a connection between wired output (14) and a connector electrically associated with wired output (14). Such data could be used to perform security functions (e.g. someone stealing a trailer) or safety functions (e.g. when a wired connection has been unintentionally disconnected). For such a configuration processing device (16) is configured to transmit a relatively low-power signal to an electronic device associated with vehicle (5). Such electronic device within vehicle (5) would then perform any number of functions including transmitting an emergency signal to a remote location, blowing the horn, flashing lights, and transmitting a disabled signal.

Similarly, processing device (16) is configured to detect unauthorized decoupling. An unauthorized decoupling may result from smart light control unit (10) losing communication with a smart light, or detecting the removal of an electrical connection at a wired output (14), or removal of the smart light controller from socket (9). For such a configuration, a power source may be disposed within smart light controller (10) that is electrically associated with controller (8) (if needed). When an unauthorized decoupling is detected processing device (16) generates a disabling signal. For example, such disable signal may engage the braking system of a properly configured trailer.

For yet another embodiment, sensor (20) includes a power quality sensor for monitoring the quality of power supplied to smart light controller 10. Alternatively, such a sensor may be used to monitor the power quality of a power source associated with external device such as a battery used to power emergency trailer brakes. Such sensor data may be stored in memory (18), evaluated by processing device (16), and/or transmitted to a remote device.

Another alternative embodiment for sensor (20) includes a proximity sensor for detecting when an object comes within a predefined distance to processing device (16). Such data is useful when backing a vehicle or trying to connect a trailer to a trailer hitch.

For yet another embodiment, sensor (20) includes a RF sensor for detecting the presence of RF energy that may disrupt normal operation of the system. Similarly, a plurality of RF sensors may be used for detecting broadband signals and other signals (such a police RADAR). Such sensor data may be stored in memory (18) and/or transmitted to a remote device.

A biosensor (21) may also be electrically associated with processing device (16) to provide a security feature. For such an embodiment of the invention, such biosensor (21) may be any suitable type but is preferably a fingerprint scanner. For the presently preferred embodiment of the invention, enrollment samples for authorized users are collected and stored in a nonvolatile memory. There may be any number of authorized users and enrollment bio-samples. When processing device (16) determines a security bio-sample is required before activating the features within smart light controller (10), processing device (16) generates a signal requesting a bio-sample. Such signal may be a simple flashing light. A user then provides a bio-sample to processing device (16), via biosensor (21). Processing device (16) then compares the real time bio-sample with the enrollment bio-sample. If processing device (16) determines that the two bio-samples are sufficiently similar, the features of smart light controller (10) are enabled. Otherwise smart light controller 10 is disabled.

One exemplary method for configuring processing device (16) to detect when a bio-sample is needed is now described. For such a configuration, when smart light controller (10) is disassociated from socket (9), processing device (16) notes the disassociation using a flag stored in memory. The next time processing device (16) is electrically associated with socket (9), the status of the disassociation flag is examined and a real-time bio-sample is requested.

For one alternative embodiment, a unit enable device is used to activate smart light controller 10. For this embodiment, a unit enable device is electrically associated with port 28 to activate smart light controller 10. For one embodiment, unit enable device includes a chip that holds unique activation data that is examined and verified by processing device (16). If valid activation data is received by processing device (16), smart light controller (10) is enabled. Otherwise, smart light controller (10) is disabled. Such activation data may comprise a security code that is incorporated into data-signals generated by smart light controller (10). Such a configuration provides a security function as well as an anti-interference function. As described later, only smart lights (50) that have been activated with the same activation data will be able to respond to data-signal transmitted by smart light controller (10). First, as a security feature, smart light (50) devices that have been stolen will not be able to respond to a transmitted data-signal. Second, smart light (50) devices associated with a first smart light controller (10) device will not be affected by data-signals generated by a second, nearby, smart light controller device that has been activated with different activation data.

Smart light controller (10) is preferably configured to receive power via inputs (12). Alternatively, smart light controller (10) may receive power from an internal power source such as a battery.

Figure 3:
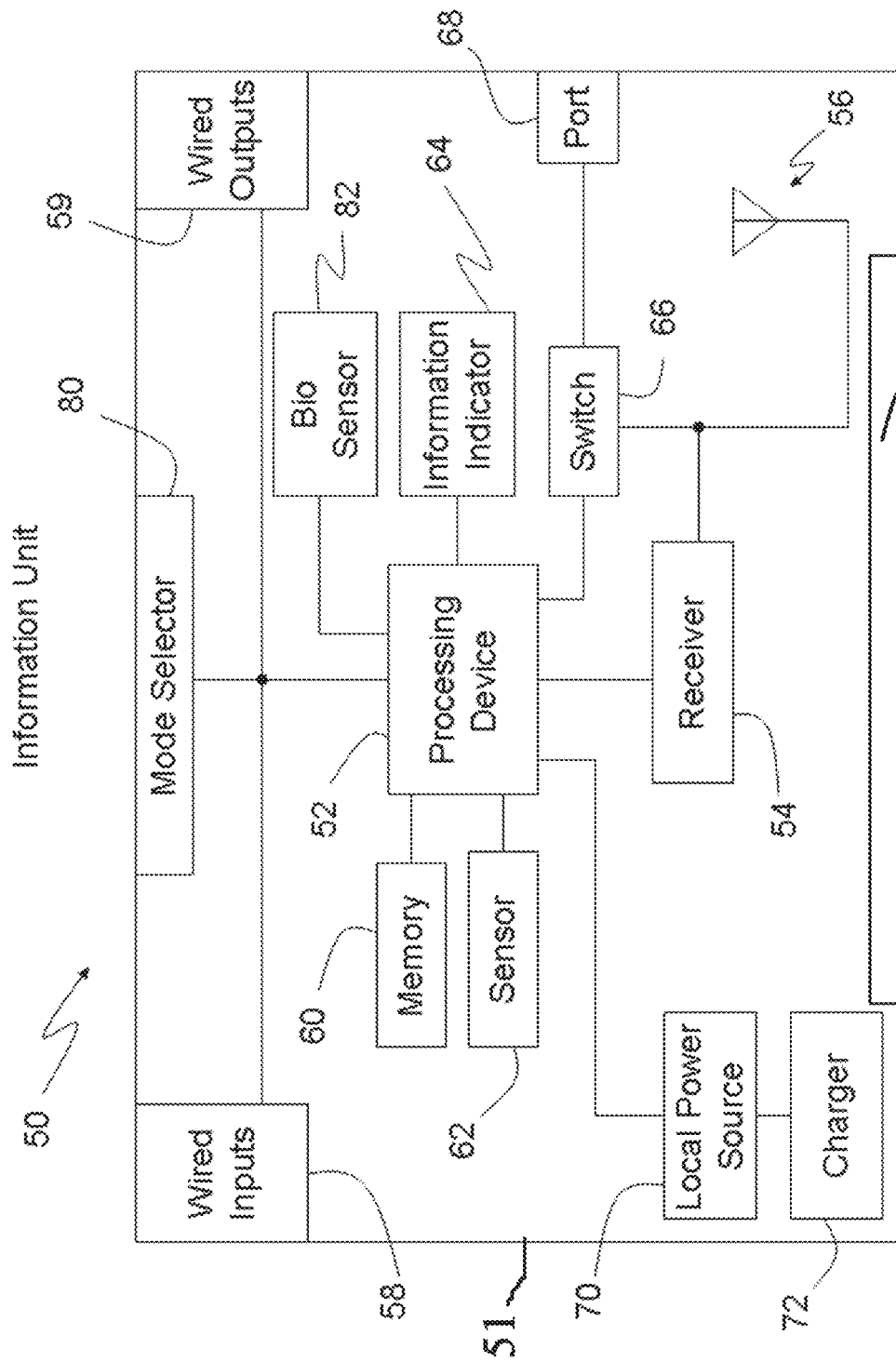
FIG. 3 is one exemplary block diagram representation of an information unit.

Referring now to FIG. 3, one exemplary embodiment of an information unit (50) is presented. Information unit (50) comprises a housing (51) defining a housing interface (53) configured for being associated with an item interface. Exemplary embodiments of an item interface include a bracket configured to receive connectors such as nuts and bolts and screws. Other item interface configurations include a magnetically enabled surface such as a steel plate or a super magnet. Where the item interface is a steel plate, housing interface (53) is a super magnet. Where the item interface is a super magnet, housing interface (53) may be either a steel plate or similar surface for a super magnet. One of ordinary skill in the art will appreciate that such a configuration allows information unit (50) to be associated with a variety of items. For example, where the item is a trailer, the item interface may be a bracket on the side of the trailer configured to receive a signal light.

Information unit (50) further comprises a processing device (52) disposed within said housing (51). Processing device (52) is electrically associated with a memory (60) and a receiver (54). Receiver (54) is electrically associated with antenna (56). Information indicator 64 is electrically associated with said processing device (52).

For the smart light configuration depicted in FIG. 3 processing device (52) is configured to "listen" for a properly coded RF command signal using receiver (54) and generate the corresponding information indicator control signals. Such information indicator control signals are then transferred to information indicator (64) which in turn generates a display based on such control signals.

As described earlier, memory (60) may be an external component electrically associated with processing device (52) or alternatively, a memory integrated into processing device (52). In addition, receiver (54) may be a transceiver configured to receive and transmit RF signals. Alternatively a discrete transmitter may be electrically associated with processing device (52).

Information unit (50) may further comprise mode selector (80). Mode selector (80) is an electronic switch or electromechanical switch configured to define one of a plurality of display modes. For example, information unit (50) may be the left signal light associated with the rear of a trailer. For this configuration, mode selector (80) is set to instruct processing device (52) that information unit (50) is to perform the functions of a left signal light. Alternatively, information unit (50) may be a right signal light associated with the rear of a trailer. Other smart light configurations include running lights. Thus, mode selector (80) may have left, right, and running light selection options. Any suitable selection technology may be used to implement the mode selector (80) function. Such selection technology includes a magnetic reed switch, a mechanical switch, an infrared interface, and a weigan wire based switch.

Information unit (50) further comprises a power source disposed within or associated with housing (51). Alternatively, information unit (50) may provide a power interface configured for being electrically associated with an external power source. For one embodiment, local power source (70) is a rechargeable battery. Local power source (70) may further be electrically associated with a charging device (72). Exemplary embodiments of charging devices include photovoltaic cells associated with housing (51) and electrically associated with battery (70). Other charging devices include a device comprising a coil of wire and a super magnet where the super magnet osculates about the coil inducing a voltage in the coil.

As noted above for smart light controller (10), sensor (62) may be any number of sensors configured for generating a sensor signal related to the smart light 50 environment. Possible sensor technologies include temperature, visual (image), audio, continuity, power quality, proximity, acceleration, and RF sensors. The discussion presented above for such sensors applies equally here.

Information unit (50) may further comprise a communication port (68) for electrically associating processing device (52) with external devices. One use for communication port (68) is to provide data path for translating data between processing device (52) and an external devices. Such data path may be used to transfer program code, firmware code, security codes, are in any other appropriate data. For example, communication port (68) may be used to activate information unit (50) using an external security device such as a dongle. For example, when a dongle device, comprising a security code, is electrically associated with port (68), processing device (52) retrieves a security code that is used to determine when a properly coded RF command signal/RF control signal (i.e. an RF signal comprising the same security code) has been received.

Figure 4:
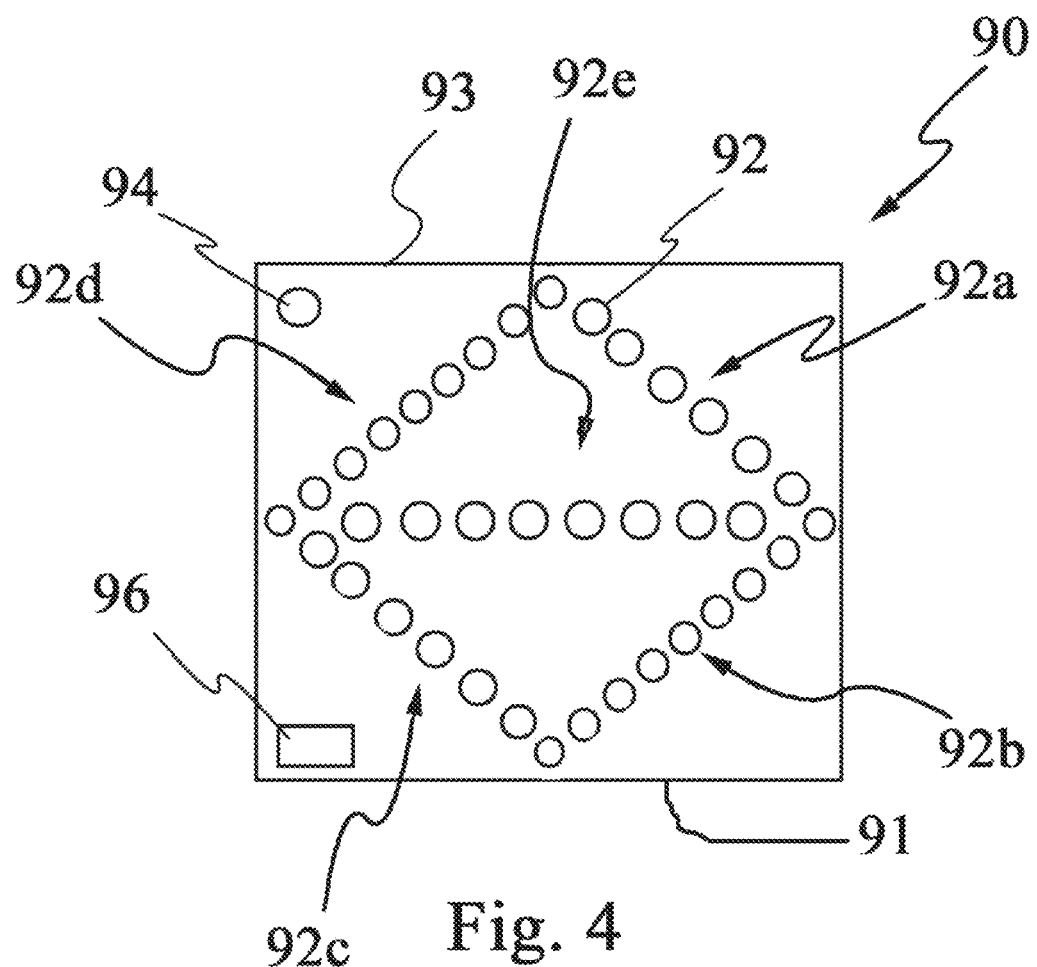
FIG. 4 is a front plan view of one exemplary embodiment of a universal display.

For one alternative embodiment of the invention, information indicator (64) comprises a universal display that may be used in a plurality of locations. Referring now to FIG. 4, one exemplary universal display (90) is presented. Universal display (90) comprises a plurality of LED lights (92) or other low power consumption light devices. For the embodiment depicted in FIG. 4, the LED lights (92) are configured in rows comprising row (92a, 92b, 92c, 92d, and 92e). Universal display (90) may further comprise sensor interface (94) and sound interface (96). Sensor interface (94) may be used, for example, to provide a window for an image sensor and sound interface (96) may provide an acoustic transparent boundary.

For the purposes of this document, lower powered lighting elements includes LED (light-emitting diodes), OLEDs (organic LEDs) and PLEDs (polymer light-emitting diodes).

For the presently preferred embodiment, an orientation sensor is electrically associated with processing device (52). Processing device (52) uses orientation sensor to determine when housing (11) is oriented in a particular direction. For example, processing device (52) uses the orientation sensor to determine if side (93) or side (91) is the top side. If processing device (52) determines that side (93) is the top side, and processing device (52) receives a left turn signal, LED rows (92d, 92c, and 92e) are activated. Alternatively, if processing device (52) determines that side (91) is the top side, and processing device (52) receives a left turn signal, LED rows (92a, 92b, and 92e) are activated. One of ordinary skill in the art will appreciate that such a configuration allows information unit (64) comprising universal display (90) to be used as a left signal light or a right signal light without the need for a mode selector. For such an embodiment, the housing interface should be positioned in a universal location such as the center of the back of the unit or two housing interfaces should be used.

For another embodiment of the information unit (50), a motion sensor is electrically associated with processing device (52). For such embodiment, processing device (52) is configured to place information unit (50) and a sleep mode when no movement is detected for a predefined amount of time. While in sleep modes, processing device (52) continues checking for motion. When motion is detected, information unit (50) wakes up. Similarly, while in sleep mode, processing device (52) may periodically scan for RF signals. As used in this document, periodically means to do something now and again at random intervals, to do something at predefined equal intervals, or randomly at unknown intervals.

For one alternative embodiment, the motion sensor is an accelerometer. Processing device (52) is configured to use the accelerometer to determine when information unit (50) is moving in a particular direction (such as reverse/packing up). When processing device (52) determines that information unit (50) is moving in a predefined direction, processing device (52) implements one or more predefined routines. For example, when information unit (50) is associated with a trailer, and processing device (52) determines that the trailer is backing up, processing device made generate a noise as a warning. In addition, processing device (52) may turn on backup lights.

Figure 5:
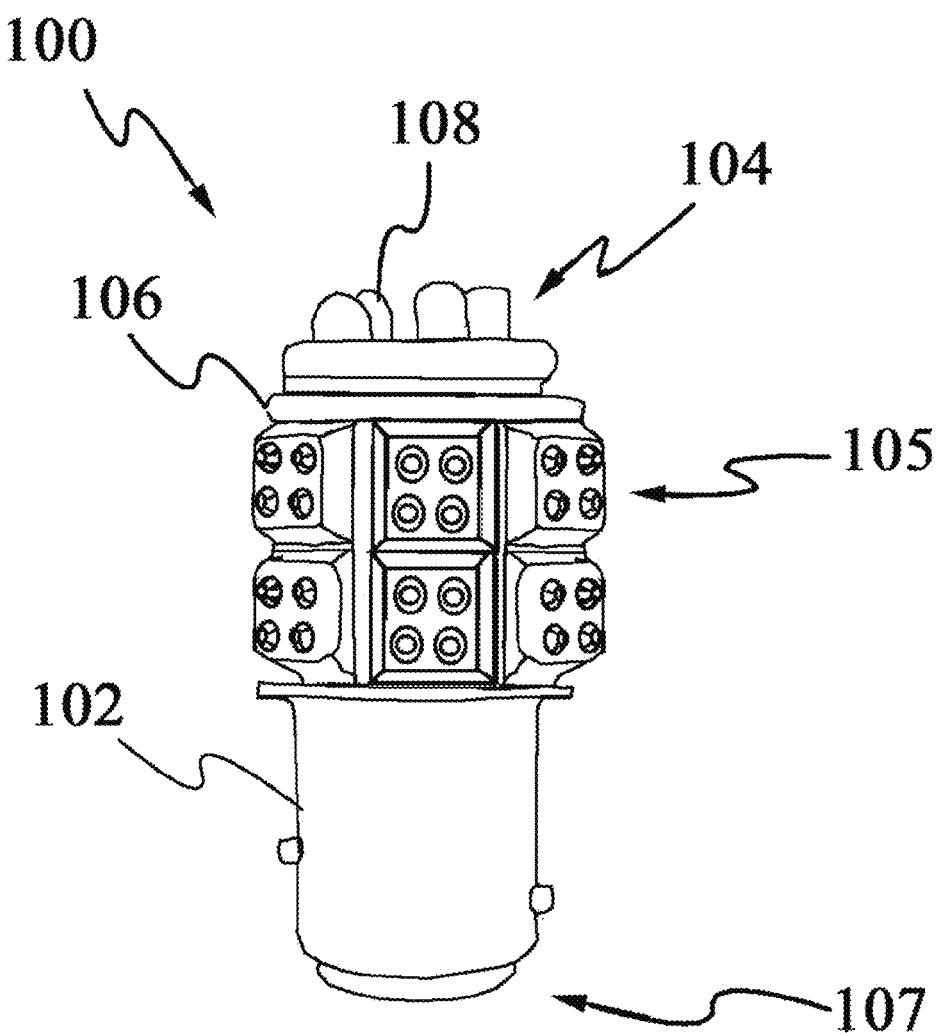
FIG. 5 is a side plan view of one exemplary embodiment of a smart vehicle light bulb.

Referring now to FIG. 5, one exemplary embodiment of a smart vehicle light bulb configured for transmitting RF-Command signals is presented. Smart vehicle light bulb (100) comprises a housing (102) defining a first end (107) and a second end (108), wherein said first end (107) is configured for being associated with the signal paths of a vehicle light interface. Embodiments of a vehicle light interface include light sockets found in a typical vehicle light fixture. It should be appreciated that for the configuration depicted in FIG. 5, smart vehicle light bulb (100) may be used to replace traditional incandescent vehicle light bulbs.

Second end (108) is configured for receiving a light-generator (108). As depicted in FIG. 5, light generator (108) comprises a plurality of relatively low power LEDs. It should be appreciated that any suitable light source may be used. In addition to light generator (108), secondary light sources (105) may be provided to generate more light.

A processing device is disposed in housing (100) and is electrically associated with a light generator (108) and said signal paths. Alternatively, the processing device may be disposed within light generator (108). The processing device preferably includes memory integral to the processing device although external memory may be used. Similarly, the processing device is an RF enabled chip such as the ones manufactured by Microchip or Chipcon. For such embodiment, the processing device is a single integrated component comprising a processor, memory, and a RF transmitter.

For the smart vehicle light bulb (100) configuration depicted in FIG. 5, when power is supplied to first end (107), at least one light source is activated. A light source (108) may provide a stop signal function while secondary light source (105) provides a running light function. In addition, the processing device is configured to detect such power signals and transmit a control signal to a remote device such as a trailer light. Thus, the signal light function is "cloned" to a second remote smart light unit.

In addition, the processing device within smart vehicle light bulb (100) may be further configured to monitor the power quality of the power being supplied to the smart vehicle light bulb and to turn off said smart vehicle light bulb when the determined power quality falls below a predefined level. The processing device may additionally transmit a power quality warning signal.

Smart vehicle light bulb (100) and information unit (50) may further include a high powered focused light source electrically associated with said processing device. The focused light source is configured for generating a warning signal to other vehicles. Preferably, the focused light source is of sufficient power to generate a warning signal that can be intercepted by a second vehicle following a first vehicle. The first vehicle is configured with taillights comprising smart vehicle light bulbs including the focused light source feature. When a driver in the first vehicle applies the brakes, the smart vehicle light bulbs activate indicating the vehicle is stopping and the focused light source activates and transmits a stop warning signal to a vehicle that may be following and within range of the stop warning signal. If a second car following the first car is appropriately equipped with a receiving device, the stop warning signal will be intercepted and a notification will be issued to the driver of the second vehicle. Alternatively, as noted above, the smart light bulb (100) may comprise sensors such as an accelerometer and proximity sensors. Smart bulb (100) may transmit said stop warning signal based at least in part of such sensor signals and a receiver in the second vehicle may be configured to automatically apply the brakes thereby slowing down the second vehicle (e.g. when the accelerometer reading indicates the first vehicle's brakes have been "slammed on" and/or the second car is "too close"). It will be appreciated by one of ordinary skill in the art that such stop warning signal may be transmitted using any electromagnetic signal such as an RF based signal without departing from the scope and spirit of the present invention.

Smart Light with Battery Backup

Figure 6:
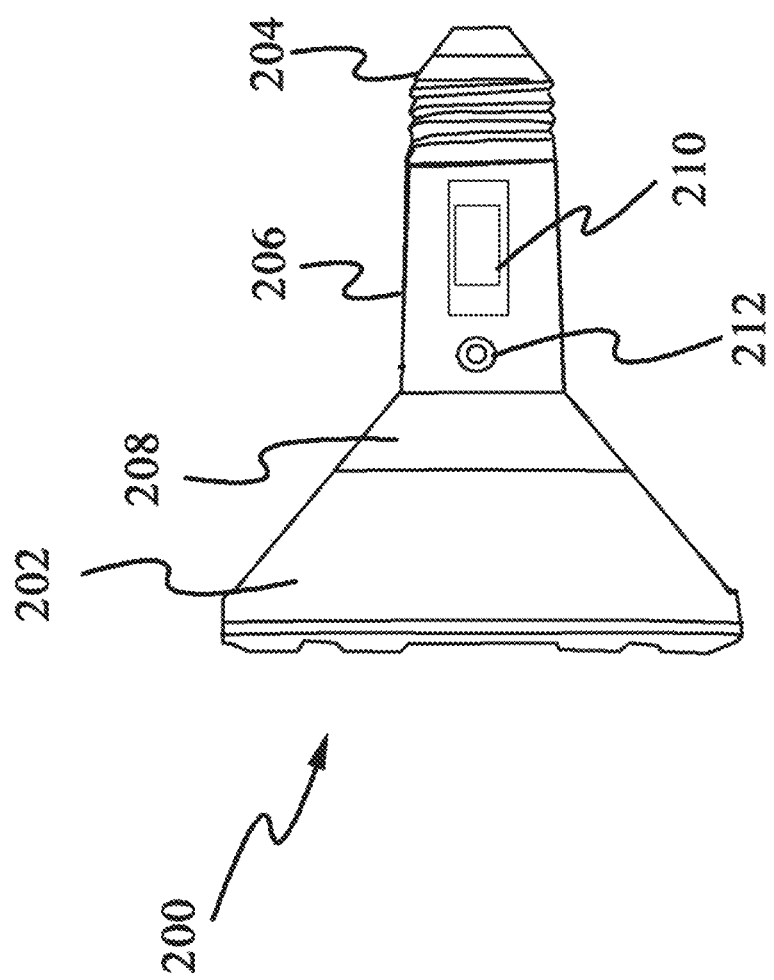
FIG. 6 is a side plan view of one exemplary smart light configured for being electrically associated with a light fixture.
Figure 8:
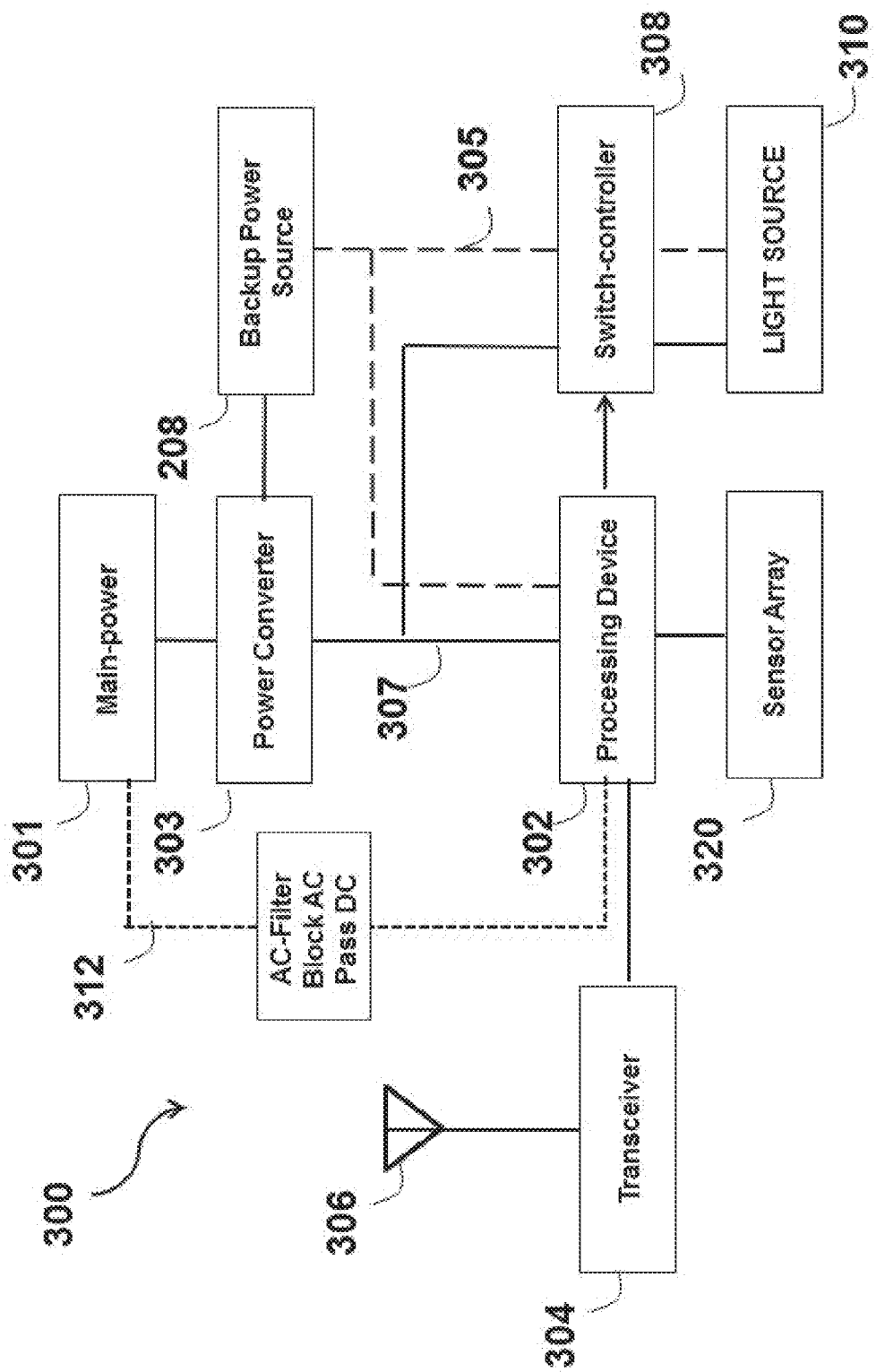
FIG. 8 is an exemplary block diagram representation of a smart light with battery backup.
Figure 9:
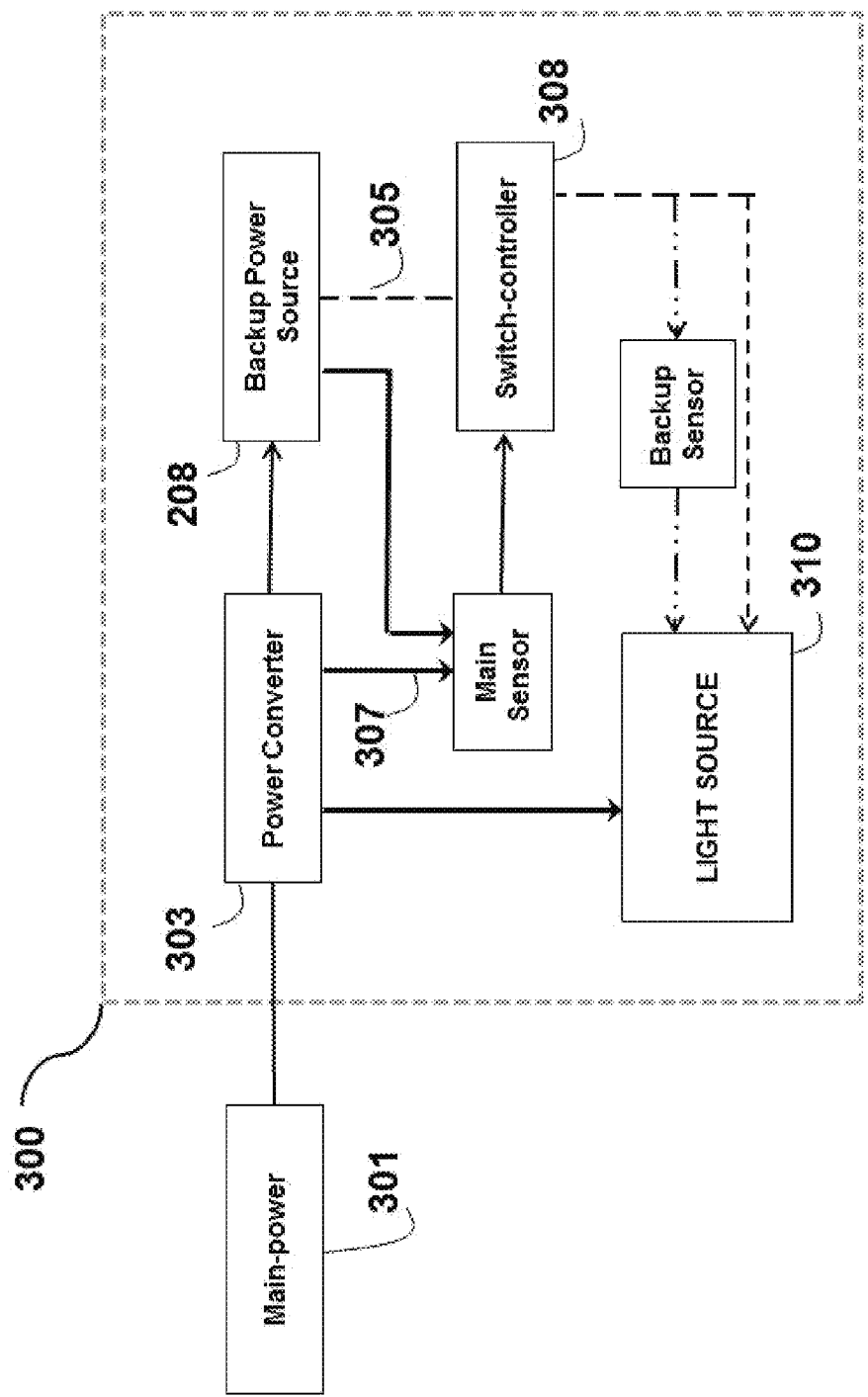
FIG. 9 is an exemplary block diagram of one alternative representation of a smart light.

Referring now to FIG. 6 and FIG. 8, one exemplary embodiment of a smart light with battery backup configured to provide a plurality of lighting functions is presented. For the smart light (200) depicted in FIG. 6, the smart light comprises a housing (206) defining a first end (204) and a second end (202). Dispose between first end (204) and second end (202) is backup power source (208). Dispose within housing (206) is electronic module (300) configured for controlling smart light (200). The electronic module comprises a processing device (302) electrically associated with a memory (integral or external). The processing device is further electrically associated with a transceiver (304) that is electrically associated with an antenna (306). It should be appreciated that the processing device (302) and transceiver (304) may be integrated into a single device such as the ones manufactured by Chipcon®.

As depicted in FIG. 6 and FIG. 8, the first end (204) of smart light (200) is configured for being associated with a power interface of a power fixture (such as an Edison socket) thereby defining main-power (301). The power supplied through/to the power interface would normally be controlled by a typical light switch (sometimes referred to herein as the main switch). One of ordinary skill in the art will appreciate that there are many possible levels of input power that may be supplied to main-power (301) but that for the typical household lighting fixture such power input is 120 Vac. That said, any typical lighting voltage values/power values may be supplied to main-power (301) without departing from the scope and spirit of the invention. For the presently preferred embodiment, first end (204) defines a traditional light socket screw-in electrical connection (Edison fitting). Such a feature allows smart light (200) to be electrically associated with a typical lighting fixture found in many homes.

When first end (204) is electrically associated with a power fixture, and the power fixture is active and supplying power to main-power (301), power to smart light (200) is supplied by the power fixture. Notably, as will be described below, smart light (200) contains its own power source, backup power source (208), and when power is not being supplied to main-power (301), the smart light (200) is powered by backup power source (208) as described below.

One of ordinary skill in the art will appreciate that there are many wiring configurations possible for supplying power to the light elements (light source 310 in FIG. 8) and the electrical components without departing from the scope and spirit of the present invention as described in the preferred embodiments below.

As noted above, when first end (204) is electrically associated with a power fixture, and the power fixture is active and supplying power to main-power (301), power to smart light (200) is supplied by the power fixture. However, when there is no power being supplied to main-power (301), the backup power source (208) supplies power to the smart light (200) components. Such a feature can be accomplished in at least three ways. First, the main-power (301) can be appropriately converted by power converter (303) to define a secondary power and then such secondary power selectively supplied to light source (310) and other electronic components. Second, for one alternative embodiment, the main-power (301) may be converted and configured to supply power to the backup power source (208) (thereby keeping it charged) and the backup power source supplies power to various components as controlled by processing device (302). Third, both main-power (301) (the output of the converter) and the backup power source (208) may be connected in parallel and either or both supply power to smart light components according to their current status. All three methods fall within the scope and spirit of the present invention.

Initially, it should be appreciated that when there is no power being supplied to main-power (301), such can be the result of a power failure or a user purposely turning off the power (i.e. someone turns off the light).

For a first preferred embodiment, the smart light cannot determine if a lack of power at main-power (301) is a result of a power failure or someone simply "turning off the light". For such embodiment it is envisioned that the user will use a remote control to transmit an on-off control signal to processing device (302) and processing device (302) will generate the necessary control signal to determine/change the state of light source (310) (i.e. to turn the smart light on and off). For such preferred embodiment, the main switch (e.g. typical wall switch) that controls the power at main-power (301) simply remains in the on position.

For this embodiment, when main-power (301) is supplying power, the smart light is powered by either main-power (301) as converted by power converter (303) or backup power source (208), or both (as described above). To control the state of the smart light, a user would simply use a remote control to transmit an RF signal to instruct processing device (302) to turn on or off light source (310). Alternatively, a user could simply manually turn off the smart light using switch-controller (308). Conversely, when there is no power at main-power (301) (from a power failure or from turning off the main light switch), the smart light remains on and is controlled using RF signals generated by a remote control device. Additionally, as noted above and below, the smart light can be removed from its fixture and carried like a typical flashlight and turned on and off using switch controller (308) or a remote control.

For one alternative preferred embodiment, the smart light can determine whether a lack of power at main-power (301) is a result of a power failure or someone simply "turning off the light". For such embodiment it is envisioned that the user may either use the main switch that controls the power at main-power (301) to turn on/off the smart light or a remote control to transmit an on-off control signal to processing device (302) and processing device (302) will generate the necessary control signal to determine/change the state of light source (310) (i.e. to turn the smart light on and off).

For this embodiment, the power switch that supplies power to main-power (301) is a smart switch that generates a power fail signal. Such power fail signal may be an RF based signal that is received by processing device (302) via transceiver (304). Alternatively, the power fail signal may be a signal that is transmitted over connection (312) to processing device (302). Such wire based power fail signal may be a simple DC voltage, such as 5 Volts, that is applied at an input of processing device (302) via an AC filter that blocks AC and passes DC (for example). For yet another alternative embodiment, a power fail signal is generated by a emote device associated with the same power grid that supplies power to the light fixture associated with the smart light.

When processing device (302) is receiving a power fail signal, processing device (302) generates the appropriate control signal to control light source (310). When processing device (302) is not receiving a power fail signal, the on/off state of light source (310) is controlled by either the smart main power switch or the processing device (302) (via remote control command signals).

It should be appreciated that FIG. 8 presents one possible wiring configuration where either main-power (301) supplies power to the smart light when power is available and the backup power source (208) is activated to supply power to the smart light when there is no main-power (301). FIG. 8 also shows the electrical connections for the configuration where the processing device (302) and light source (310) always receives its power from the backup power source (208) and main-power (301) is simply used to maintain a predefined power level in backup power source (208).

For one embodiment, processing device (302) is further configured for communicating with a home alarm system. Processing device (302) is configured to receive control signals from the alarm system and implement functions corresponding to such control signals. Such functions may be a turn on/turn off light routine where the smart light is turned on/off according to a predefined schedule.

Additionally, for one configuration there may be a smart light module electrically associated with a string of lights where the string of lights is controlled by light routine that is "seasonal". For example, the string of lights could be used as Christmas lights or they could be a string of lights of a trailer being pulled by the vehicle. Alternatively, such light routine may be a real-time response to an external stimulus such as sound waves detected by a microphone electrically associated with processing device (302). For this configuration, for example, the smart lights may change state (turn on and off) depending upon a musical compilation being played within the range of such microphone. It should be appreciated that such "string of lights" may be wired or wirelessly connected (i.e. on smart lights can turn on each other).

One alternative embodiment comprises a sensor array (320). It should be appreciated that while sensor array (320) is referred to as an "array" any number of sensors may be used including only one sensor. Sensor array (320) is electrically associated with processing device (302) and may include any number of sensors such as a smoke sensor, a CO2 sensor, a motion sensor, a light sensor, a photovoltaic device, and a power failed sensor. Such sensors may be wired or wireless associated with processing device (302). The processing device is configured to monitor the output of such sensors and perform a function based on such output. For example, when the sensor is a smoke sensor and the smoke sensor is generating a smoke detected signal, the processing device will transmit the appropriate signal to the alarm system and a plurality of lights may turn on to reveal a path to an exit. Similarly, the smart light can monitor its environment for elevated levels of CO2 and compared such readings to a predefined threshold values stored in memory. If the CO2 levels reached such predefined threshold levels a warning signal can be generated such as a beep or a communication signal that is transmitted to a remote device.

Similarly, when the motion sensor detects motion, processing device (302) may generate signals that turn on the smart light and/or transmit a signal to a remote device such as an alarm system or a camera.

For a smart light configured with a light sensor, such smart light can be configured to turn on depending on the level of light detected in the vicinity of the smart light. Such smart light may further comprise a photovoltaic component that is electrically associated with backup power source (208) and configured to recharge power source (208). Such a photovoltaic component may also be used by processing device (302) to determine when to turn off the smart light. For example, processing device (302) may be configured to turn the smart light off during the day and on at night.

It will be further appreciated by one of ordinary skill in the art that smart light (200) may be removed from a light fixture and used as a typical flashlight. In addition, the backup battery provides emergency lighting while the smart light is still associated with the lighting fixture for as long as the backup battery has sufficient power.

Another feature of smart light (200) relates to an emergency signal. In addition to switch (210), smart light (200) comprises alert signal button (212). Alert signal button (212) may be used to instruct smart light (200) to generate an alarm signal. Such a feature may be useful when an emergency condition is detected while using smart light (200) as a flashlight. For example smart light (200) may be "paired" with a cell phone and when the alert signal button (212) is pressed the smart light (200) may generate an emergency signal that is received by such cell phone and the cell phone then automatically performs at predefined routine such as dialing an Emergency number such as 911.

Figure 7:
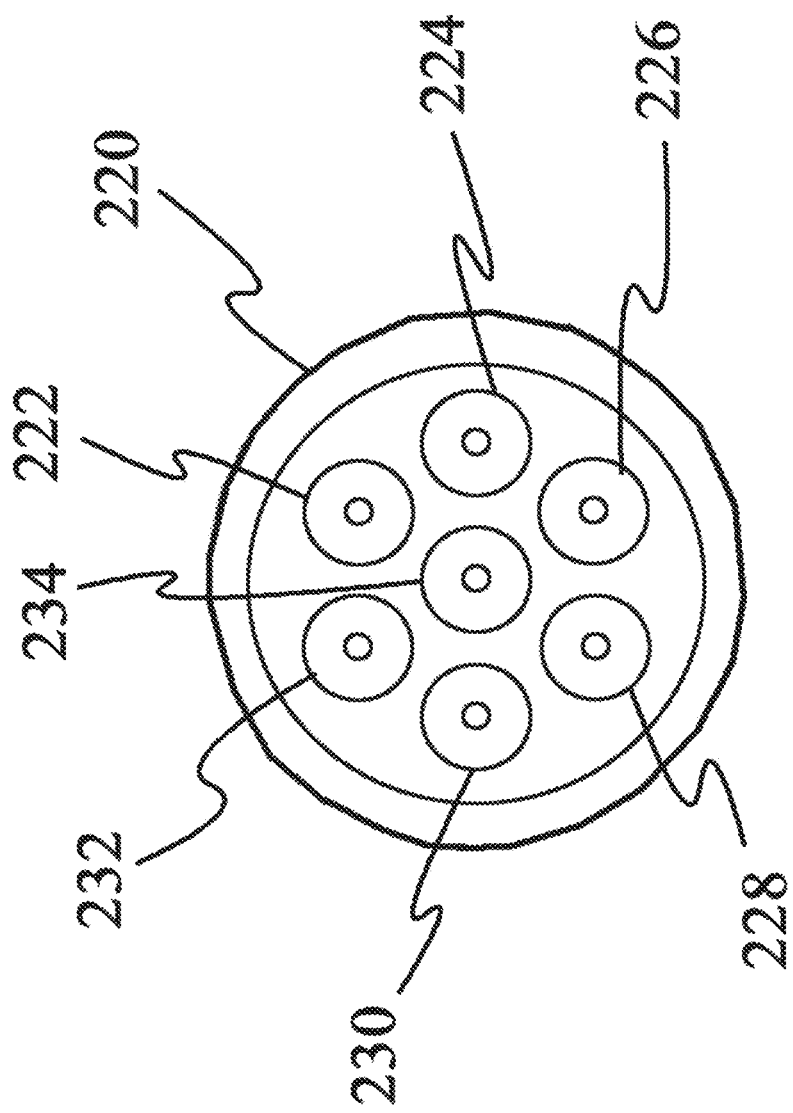
FIG. 7 is a front plan view of the light generators for the smart light depicted in FIG. 6.

Referring now to FIG. 7, a plurality of light generators (light emitters) is depicted. For the presently preferred embodiment, such light generators are LEDs although any suitable low powered lighting may be used as well as high powered lighting configured for being connected to a main power source but not the backup power source. As depicted in FIG. 7, there are seven LED light generators (222 through 234) (also called "light source"). For the preferred embodiment, every other LED is a relatively low power consumption LED while remaining LEDs are relatively high power consumption LED. One of ordinary skill in the art will appreciate that LEDs can generate different colors of light including Red, Green and Blue. For such embodiment, the processing device is configured to use the low power consumption LEDs when the backup battery is powering smart light 200. All the LEDs may be used when smart light 200 is receiving power at main-power 301. Alternatively, instead of using low power consumption and high power consumption LEDs, only have power consumption LEDs may be used but the power supply to such LEDs reduced when being powered by the backup power source (208). Alternatively, the amount of power being supplied to such LEDs may be user selectable using a component such as a rheostat.

Detection Circuit

Figure 10:
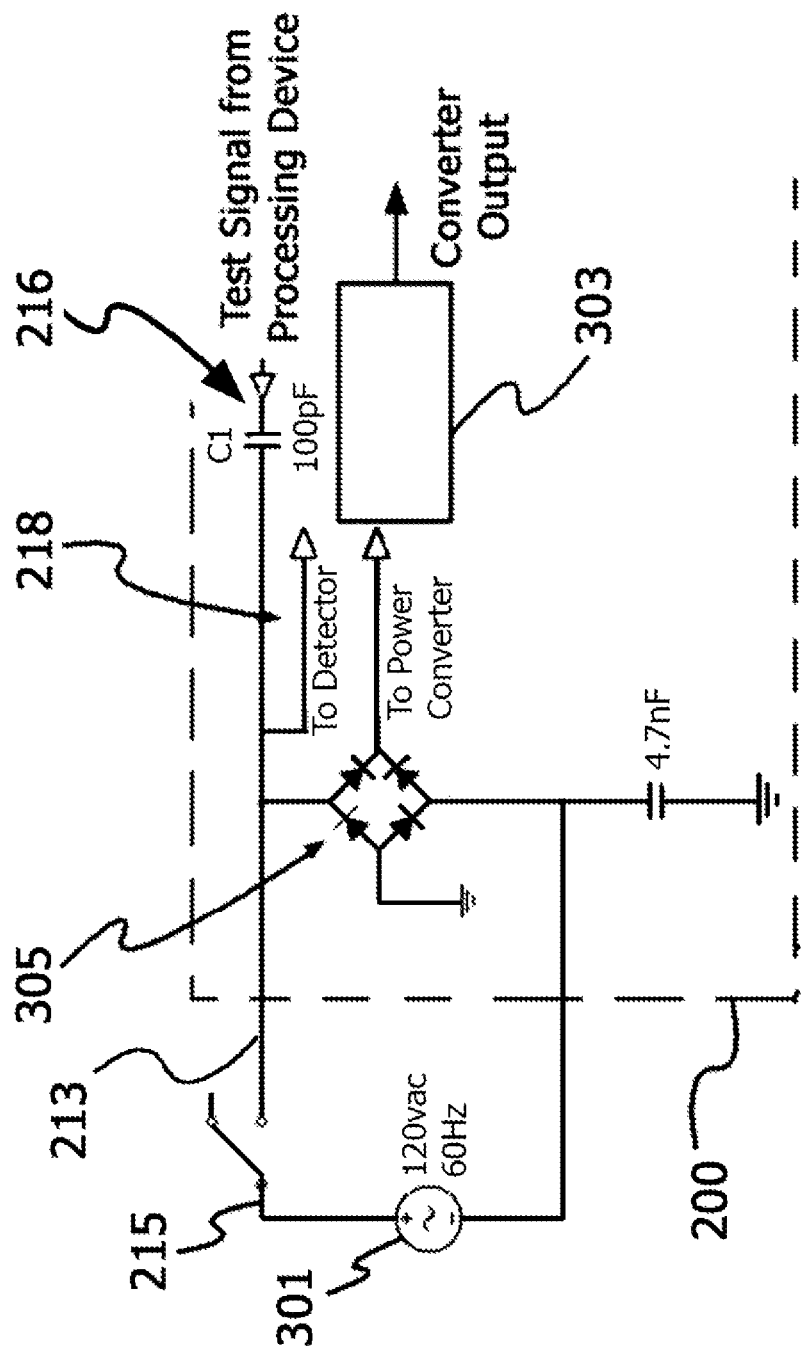
FIG. 10 is a schematic representation of one exemplary power fail detection circuit.

Referring now to FIG. 10, one exemplary embodiment of a power fail detection circuit is presented. Smart light bulb (200) is electrically associated to main power (301) through light switch (215). Rectifier circuit (305) rectifies the input voltage and the output of rectifier circuit (305) is passed to converter (303). The processing device (302) generates a test signal (216) when there is no power being supplied by rectifier (305) to determine the state of the power light as described below.

When everything is working properly and the main power source is supplying power and smart light (200) is on, switch (215) is closed and rectifier (305) is receiving power. When switch (215) is turned off (light purposefully turned off), there will be no power at rectifier (305) as switch (215) creates an "open circuit" in main power line (213). When there is a power failure, main power (301) will not be supplying power, and as a result and although switch (215) will be closed, rectifier (305) will not be receiving power.

Thus, there are two "system states" of interest when rectifier (305) is not receiving power: (a) State-off where main power is good but switch (215) open (i.e. the light is turned off); and (b) State-fail where there is a main power failure and switch (215) closed (i.e. light would work but there is no main power). One of ordinary skill in the art will appreciated that the electrical parameters of power line (213) as seen by detector (218) will be different for State-off compared to State-fail. For example, when switch (215) is closed but there is a power failure (State-fail) the electrical length of power line (213) will be longer compared to State-off where switch (215) is creating an "open circuit" (basically removing a section of the power line (213 from the circuit).

For one embodiment, State-off and State-fail electrical parameters are stored in memory. One suitable parameter would be impedance although any electrical parameter could be used. When power is being supplied by main power (301), switch (215) is closed and the converter (305) is receiving main power and no test signal is generated. When converter (305) is not receiving main power processing device (302) (or some other device) is configured to generate a test signal (216) so that detector (218) can measure the electrical parameter of interests and compare it to the stored electrical parameters. If such measurement indicates a State-off condition, the smart light turns off. Conversely, when such measurement indicates a State-fail condition, the backup power source is used to power the smart light (200).

Figure 11:
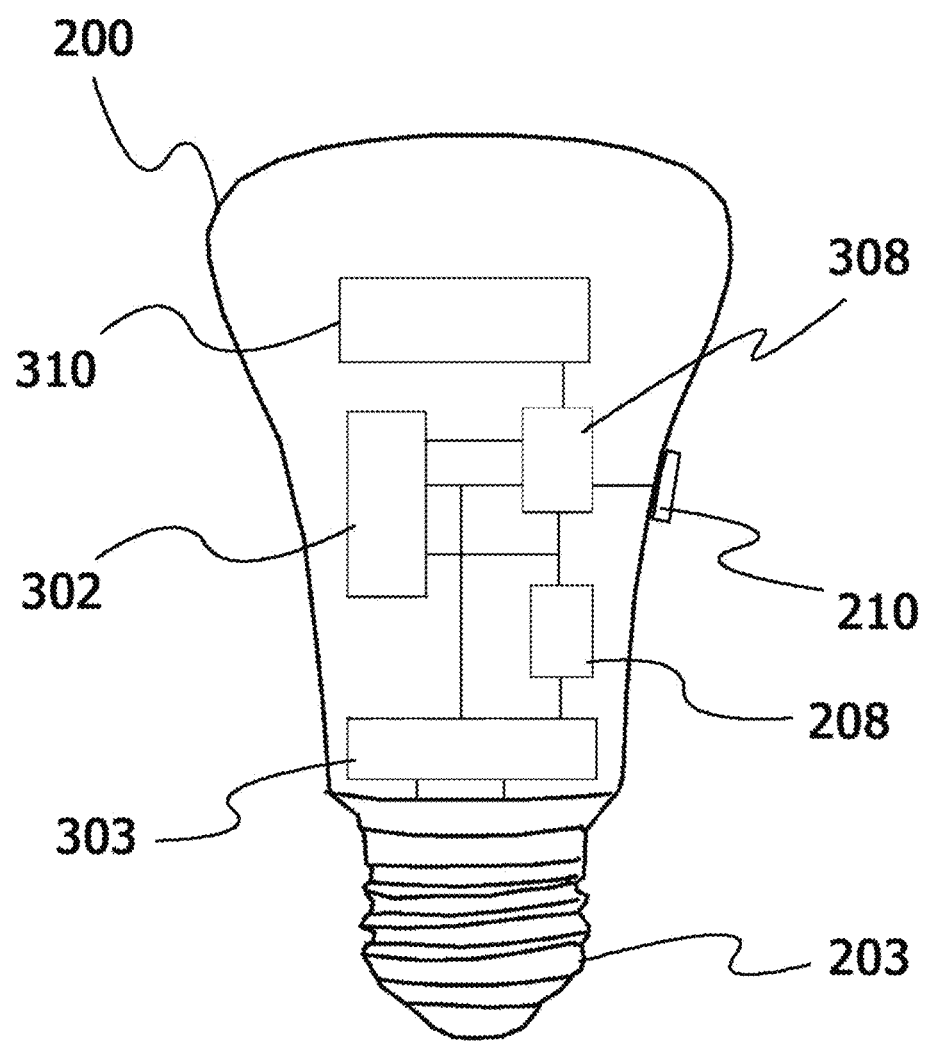
FIG. 11 is a block diagram representation of one exemplary internal configuration of a smart light.
Figure 11B:
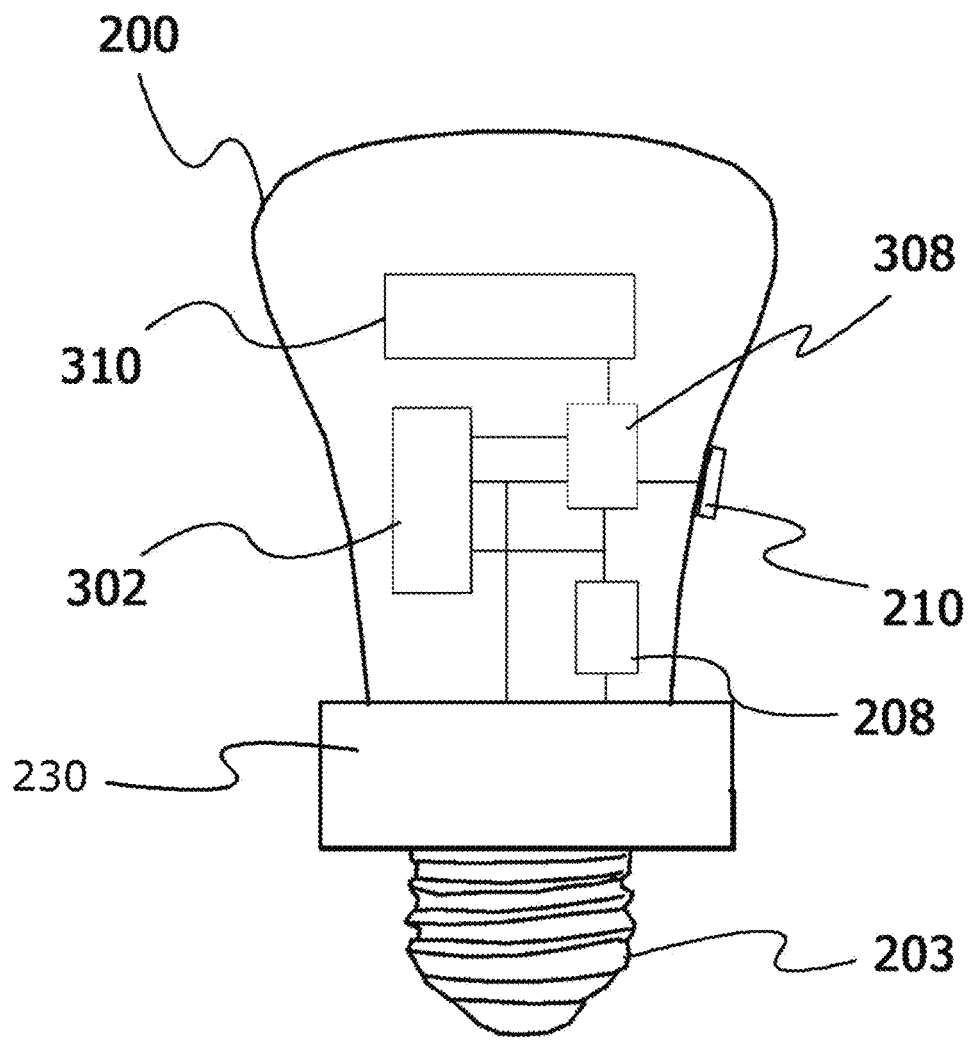
FIG. 11b is a block diagram representation of one exemplary internal configuration of a smart light and associated electronic module.

FIG. 11 presents another configuration for smart light bulb (200). Smart light bulb (200) is configured with an Edison fitting (203) configured for being associated with a lighting fixture. Main power (301) is electrically associated with converter circuit (303). The output of the converter circuit (303) is electrically associated with backup power source (208) and processing device (302) and switching element (308). Switching element (308) can be actuated by either external switch (210) or controller (302). The output of switching element (308) is electrically associated with the lighting element (310). As noted above, lighting element can be any number of low powered lighting devices such as LEDs which may be of any color including red, green, and blue. As described earlier, lighting element (310) may comprise primary lighting and secondary lighting. Primary lighting may be relatively higher powered LEDs (perhaps and 8 W to 10 W range) although any realistic power level may be used since the primary lighting element are configured to generate light when main power (301) is supplying power to smart light bulb (200) (i.e. do not have to worry about draining the backup power source). A secondary lighting is preferably a significantly lower power consumption device as it will receive power from the backup power source (208) when main power (301) is now available. For one embodiment, the secondary lighting element comprises one or more LEDs that collectively consume no more than 1 Watt although higher power levels may be used. Alternative embodiments include configurations that have only one lighting element that is powered by either Main power (301) or backup power (208).

For the currently preferred embodiment, controller (302) contains detector circuit (218) and a delay circuit configured to provide a delay feature. The delay feature is simply a predefined amount time smart light bulb (200) will remain on at after main power (301) is turned off purposefully to create a State-off condition. The delay feature is configured to allow someone to turn off smart light bulb (200) and exit a room before the light goes out.

Figure 14:
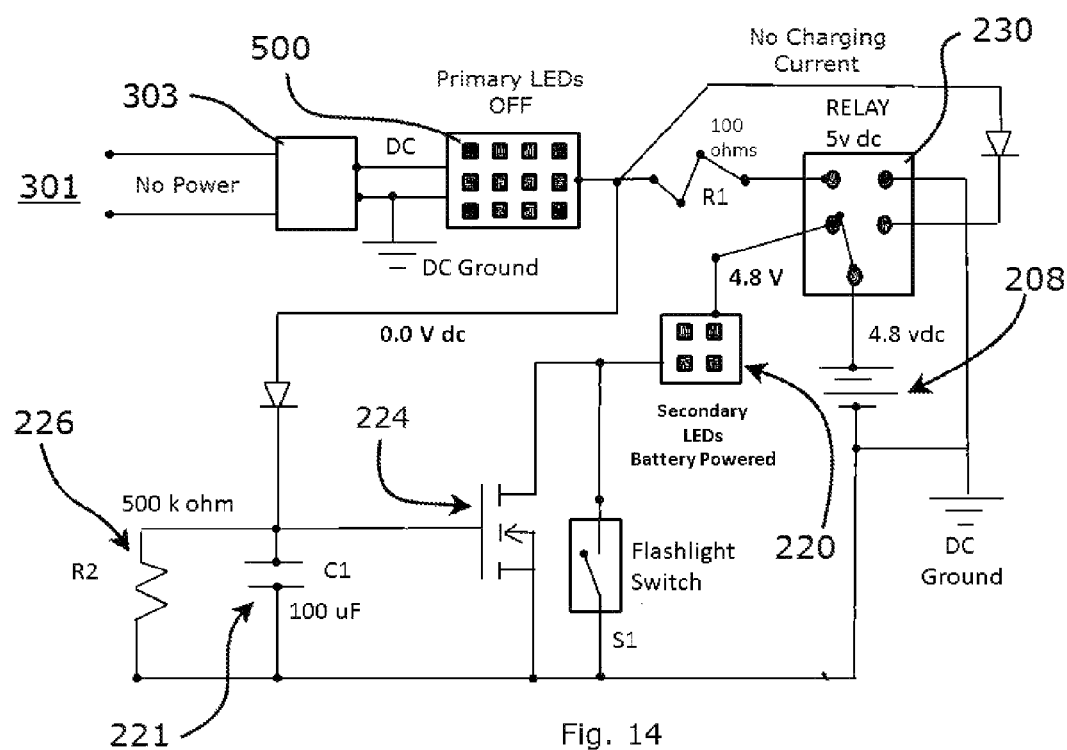
FIG. 14 is a block diagram representation of a delay circuit with main power off.
Figure 15:
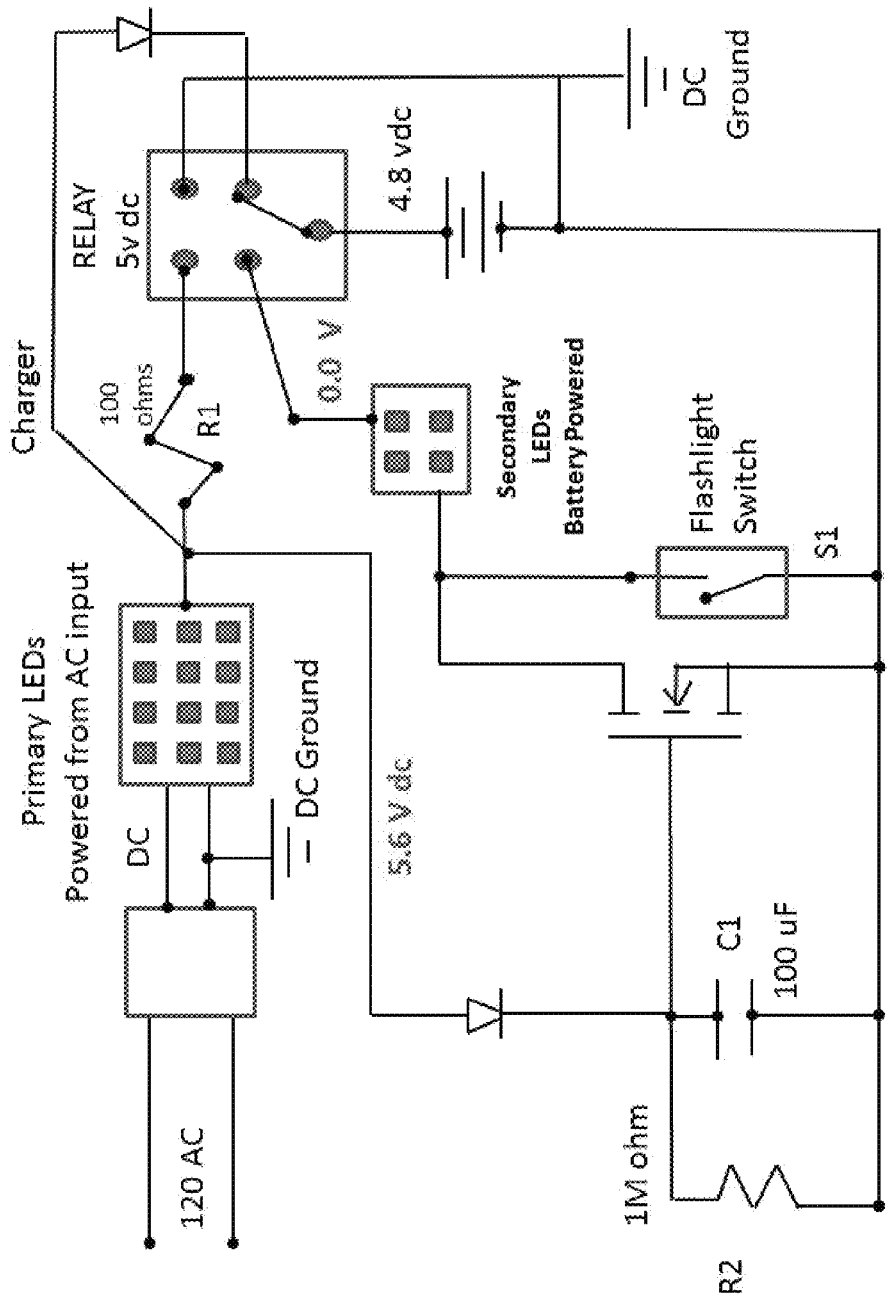

Referring now to FIG. 14 and FIG. 15, one exemplary delay circuit is presented. For this embodiment there is a primary lighting element (500) and a secondary lighting element (220). In FIG. 14, main power is off and secondary lighting elements (220) may be on depending on the state of the delay circuit and/or the flashlight switch. In FIG. 15, main power (301) is supplying power to the primary LEDs (500) and the secondary lighting elements (220) are off. One of ordinary skill in the art will appreciate that the "secondary lighting element" may be combined with the primary lighting element as an alternative embodiment.

When Main power (301) is available as depicted in FIG. 15, the primary lighting elements (500) are generating light, and delay circuit is being charged by supplying power to energy storage device (221). For the currently preferred embodiment, energy storage device (221) is a capacitor. Further, main power (301) is used to isolate the backup power source (208) from the secondary lighting element (220) by actuating backup power switch (230) while also connecting backup power source (208) to a charging current. One suitable backup power switch (230) is a relay although solid state device can be used. Preferably, when there is main power, such a relay would be engaged by main power (301) to create an open circuit between backup power source (208) and the secondary lighting elements.

Additionally, the secondary lighting element (220) is isolated from ground by delay switch (224). For the currently preferred embodiment, delay switch (224) is a mosFET transistor. One of ordinary skill in the art will appreciate that MOSFET (224) cannot conduct unless storage device (221) is charged and backup power source (208) is connected to secondary lighting elements (502). When the delay switch (224) is actuated by main power, an open circuit isolates backup power source (208) from the secondary lighting element (220). It would be appreciated that the relay can be replaced by any number transistors and circuit configurations, including using a processing device, without departing from the scope and spirit of the invention.

When main power (301) is lost as depicted in FIG. 14, the relay no longer isolates secondary lighting element (220) from backup power source (208) and MOSFET (224) can now conduct as long as storage device (221) has sufficient energy to power delay element (224). Energy storage device (221) now supplies the voltage needed to switch on MOSFET (224) allowing current to flow through secondary lighting elements (220) thereby generating light when there is no main power. Drain element (226) is configured to drain power from energy storage device (221) thereby determining how long delay period will last. For the current embodiment, energy storage device (221) is a 100 uF capacitor and drain element (226) is a two mega ohm resistor. Such a configuration will provide a delay of approximately 40 seconds. Notably, for one embodiment, drain element (226) is a variable resistor configured to allow a user to vary the delay time. One of ordinary skill in the art will appreciated all of the delay features may be performed by discrete elements or by integrated circuits as described below.

Figure 12:
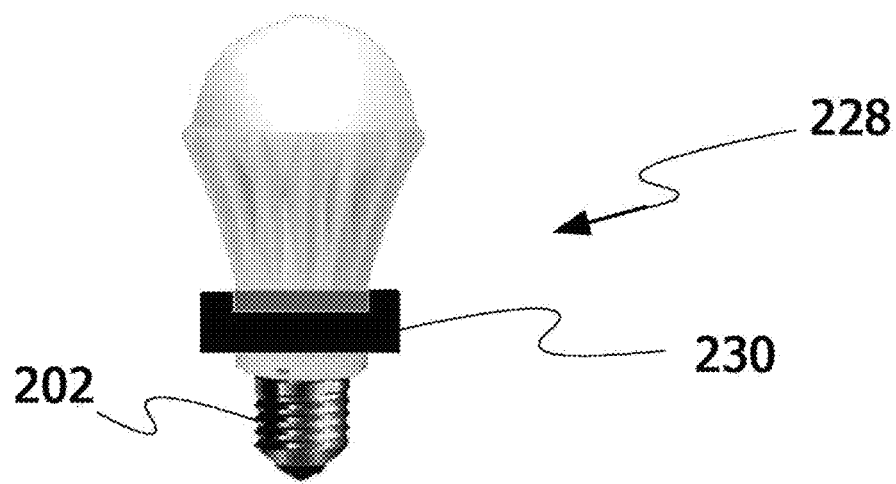
FIG. 12 is a side plan view of a smart light associated with an external electronic module.
Figure 13:
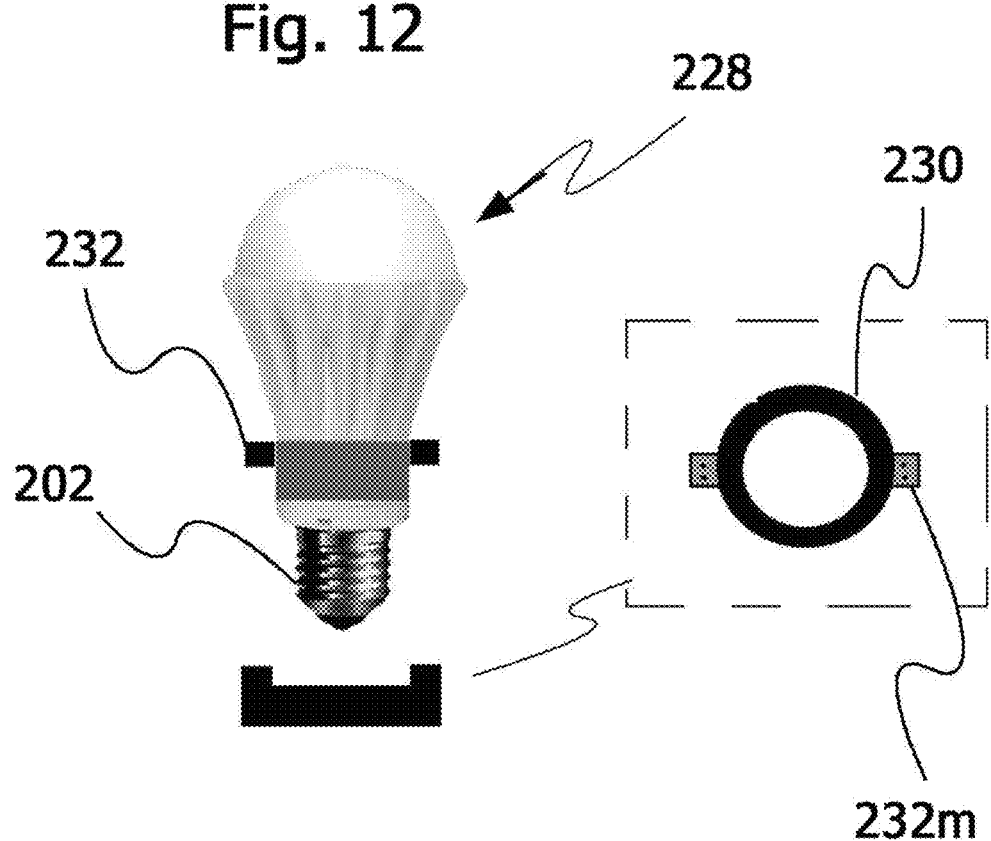
FIG. 13 is a side plan view of the smart light in FIG. 12 with the electronic module removed.

Referring now to FIG. 12 and FIG. 13, another exemplary embodiment of the invention is presented. For this embodiment of the invention the smart light bulb (228) is configured for being removably associated with electronic module (230). For this configuration any number of smart light bulb configurations can be achieved by associating anyone of a polarity of electronic modules (230). As can be seen in FIG. 13, the currently preferred embodiment of electronic module (230) is configured to define a circular ring defining an inner void suitably sized to receive second end (202) of smart light bulb (228). Electronic module (230) is electrically and mechanically associated with smart light bulb (228) using connectors (232m). For this configuration, electronic module (230) can be used to provide and of the features listed above including the backup power source (208).

Referring now to FIG. 12, another alternative embodiment of a smart light bulb (200) is presented where smart light bulb (200) comprises at least two sections releasably associated with each other. Such a configuration allows for changing of the backup power source (208) as well as switching out bulb sections when desired.

Smart Signal Light

Figure 16:
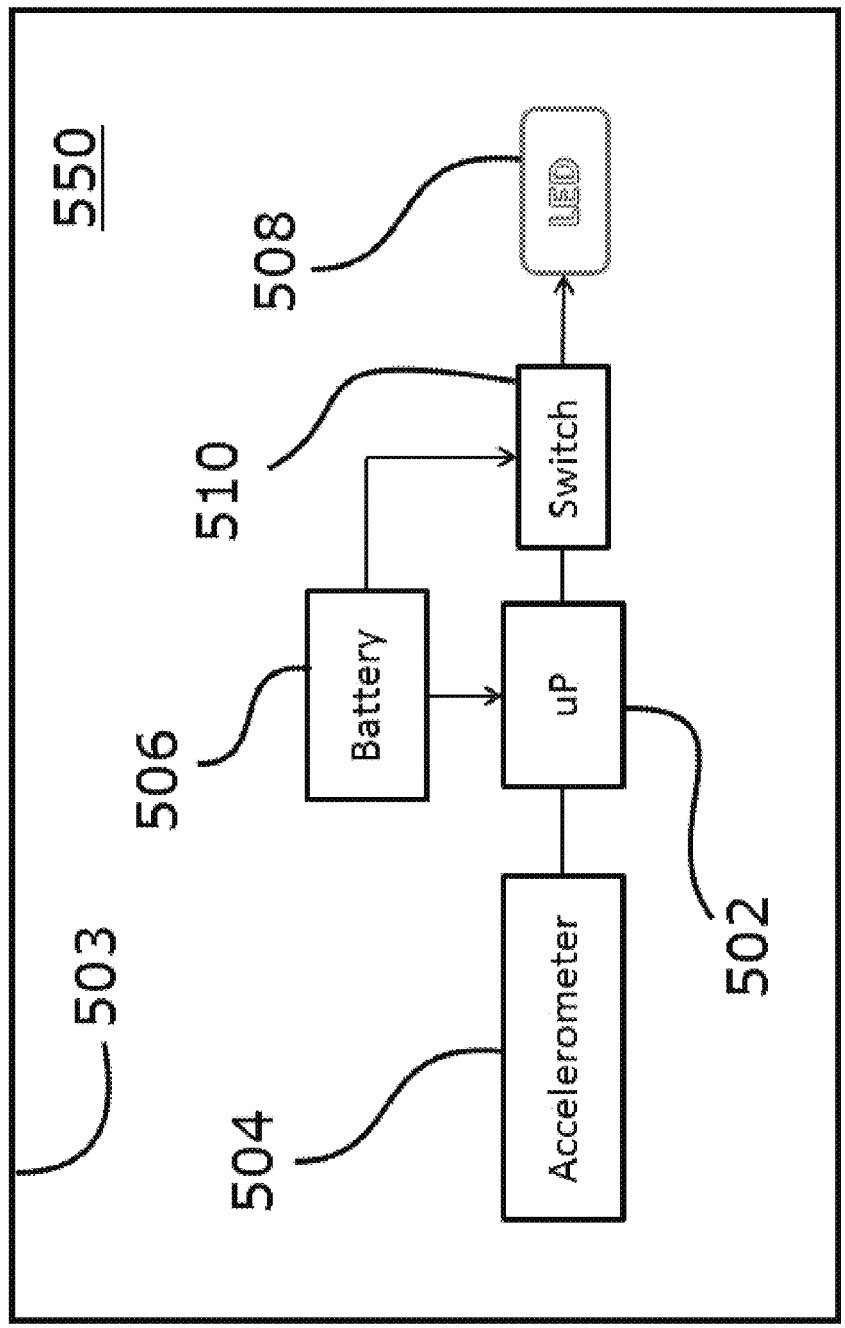
FIG. 16 is one exemplary block diagram representation of a smart light bulb configured to provide a stop light function.

Referring now FIG. 16, one exemplary embodiment of a smart signal light configured for generating signals such as stop signal. The smart signal light comprises a housing (503) configured for housing processing device (502) electrically associated with a motion sensor (504) and further electrically associated with a light source (508) through a switching device (510) wherein the smart signal light is power by power source (506). For the currently preferred embodiment, motion sensor (504) is an accelerometer.

Processing device (502) is configured to monitor the motion signals generated by motion sensor (504) and activate light source (508). When processing device (502) determines a predefined motion signal has been generated, it activates light source (508). For example, when motion sensor (504) is an accelerometer and generates a motion signal that indicates the smart light (550) is slowing down, processing device (503) activates light source (508) thereby performing a stop light function.

It should be further appreciated that a plurality of sensors may be associated with processing device (502) such as light sensors, heat sensors. Additionally, housing (503) may take any suitable shape for the application of interest and may including securing component such as magnets and other devices configured to mechanically associated the smart signal light with a user or object.

For one embodiment, processing device (502) is further configured to sense when the smart signal light is not being used and turn off to conserve power. For some embodiments, the smart light further generates different color lights depending on the signals being supplied to processing device (502). If motion sensor (504) generates signals indicating that the smart signal light is accelerating in a first direction (speeding up) processing device (502) activates light source (508) to generate a first light color (such as a "green light"). When the motion sensor (504) generates signals indicating that the smart signal light is accelerating in a second direction (slowing down), processing device (502) activates light source (508) to generate a second light color (such as a "red light").

Smart Child Seat Module

Referring now to FIGS. 6-8, exemplary smart devices and modules configured for being used in child safety seats are now considered. The details of the various electronic module configurations are fully disclosed in commonly owned U.S. Pat. No. 8,001,593 issue to Preta et al. on Sep. 6, 2011, and all the contents of such reference are hereby incorporated for all that they disclose for all purposes. Additionally, while the modules below or described as smart "child" safety device modules, such modules may be used to monitor persons and animals of any age.

For the presently preferred embodiment of the invention, a smart child safety device module is associated with or integrated into a child safety seat or similar device. The smart child safety device module is configured to communicate with a remote device, such as a vehicle controller, via a wired or wireless communication connection. The smart module comprises a processing device electrically associated with a power source and a sensor array. Such a sensor array may include one sensor or a plurality of sensors and may be configured to monitor any number of predefined parameters such as temperature, humidity, motion, sound, smoke, and $CO_2$ level.

Initially, it should be appreciated that the functions represented by individual module components may be performed by ASSPs (Application Specific Standard Product) although one or more components may be integrated into ASSP chip sets. Manufactures of such devices include Motorola, and Texas Instruments. In addition, Complex Programmable Logic Devices (CPLD) may be used to interface the various ASSP components to a system buss allowing one system component to interface with another component. Manufactures of suitable CPLD devices include Lattice's (ispMACH 4000 family) and (Altera's MAX 7000-series CPLD).

The Processing device is electrically associated with a buss or, in the alternative, component specific communication paths (such as traces) and is configured to perform various tasks including data management, data storage, data transfers, resource monitoring, and system monitoring. For the preferred embodiment, processing device is a microprocessor that supports standard operating systems and application software although other processing devices may be used such as ASICs (application specific integrated circuit) or ASSPs (application specific standard product). The processing device may comprise onboard ROM, RAM, EPROM type memories.

The buss, if there is a buss, is configured for providing a communication path between the various electronic components and devices electrically associated with buss. The buss may also comprise electrical paths for transferring power between power sources.

For one embodiment a DSP/ASSP is electrically associated with the processing device and is preferably configured to perform signal processing tasks such as voice, audio, video, encoding, decoding as well as other data and signal processing functions.

The child safety device module may further comprise a display that is electrically associated with the processing device and is configured for displaying the various user settable parameters and other information. For the preferred embodiment the display is a LCD display configured with touch screen functionally. A graphics accelerator may be used by the processing device that provides support for megapixel cameras and 3D graphics applications. One suitable graphics accelerator is the MQ2100 manufactured by MediaQ.

The smart child safety device module further comprises communication circuitry, such as a transmitter or transceiver, electrically associated an antenna and the processing device. The communications circuitry is configured to transmit a data signal to a remote electronic device. It should be noted that embodiments where the communication circuitry comprises only a transmitter fall within the scope of the invention. For one preferred embodiment, the communication circuitry consumes relatively low power and is configured to communicate with an external device that is expected to be within range of a transmitter signal. For example, for one embodiment the smart child safety device module is associated with or integrated into a child safety seat. Because such safety seat is expected to be within communication range of a communication device associated with a vehicle or a person (such as a cell phone), its transmitter can be relatively low powered thereby saving energy. That said, smart child safety device modules with more powerful transmitters may be used including well known technologies for wireless communications such as GPRS, GSM, GPRS, 3G, and EDGE enabled networks as well as WAP networks. Consequently, for some embodiments, the communication circuitry may define common cell phone communication technology.

Some embodiments may include both a low power transmitter and a high-power transmitter. For low power transceivers, (a low power transmitter relative to the above described communication circuitry), such transceiver may operate in any number of unlicensed bands although frequencies requiring a license may be used. Suitable technologies include Bluetooth and Zigbee (IEEE 802.15). Zigbee is a low data rate solution for multi-month to multi-year battery life applications. Zigbee operates on an unlicensed, international frequency band. Such technologies are known and understood by those skilled in the art, and a detailed explanation thereof is not necessary for purposes of describing the method and system according to the present invention. By way of example, the low power transmitter may provide communications with devices such as cell phones and may further be operable to transmit on one or more FM bands to provide communication through a FM radio.

For the presently preferred embodiment of the invention, smart child safety device module includes a GPS receiver electrically associated with the processing device. Such GPS device is one embodiment of a location-detector electrically associated with a processing device.

Smart child safety device module may comprise a main power input configured for being associated with a power source such as vehicle's power supply. As described above, the smart child safety device module further includes an internal power source that is used when there is no power being supplied at the main power input. Such allows a smart child safety device module to operate independently from the vehicle's power source.

Smart child safety device module is preferably electrically associated (wired or wirelessly) with a vehicle controller configured for controlling various components of the vehicle such as starting the motor, controlling the climate control system, and controlling the up down state of the vehicle's windows, lights control, horn control, and communications.

The smart child safety device module may further comprise an imaging element that is electrically associated with the processing device and configured to acquire image data that may be transmitted to a remote device by the processing device using one of the communication means. Such image data may be video that is transmitted to an LCD within the visual range of a person in a vehicle (such as a person operating the vehicle) over a wired or wireless connection that allows such person to monitor a child sitting in a child safety seat configured with a smart child safety device module without turning around and looking at child. For the preferred embodiment, an imaging interface is configured to support CMOS image input sensors such as the one manufactured by Micron® and/or CCD (charge-coupled device) image input sensors such as the ones manufactured by ATMEL® sensors. Such Imaging interface performs the necessary processing functions to convert the imaging data into a desired format before transferring such data to other devices associated with the buss.

For one embodiment the smart child safety device module further comprises an Audio module comprising a speaker and a microphone that is electrically associated with an audio codex. The audio module is configured for detecting sound waves using the microphone and converting such waves into digital data of a predefined format such as MP3. Conversely, the smart child safety device module may use the audio module to generate sound waves to play music/sound or to facilitate communications.

The sensor array electrically associated with the processor may include any number of environment Sensors electrically associated with the processing device. A sensor interface may or may not be used. Generally speaking, a sensor is a device that tells something about its environment typically using a transducer which converts a parameter at a test point to a form suitable for measurement by a sensor circuit. Stated another way, a sensor is a device which is designed to produce a signal or offer an indication in response to an event or stimulus within its detection zone. An electronic sensor is a sensor that provides such information by creating an electrical signal. Sensor technologies are known and understood by those skilled in the art, and a detailed explanation thereof is not necessary for purposes of describing the method and system according to the present invention.

A sensor array may include sensors for: (a) carbon monoxide, (b) smoke, (c) temperature (inside and/or outside), (d) outside wind speed, (e) light, (f) sound, (g) door open/closed, (h) window down/up, (j) lights on/off sensor, (k) power supply status sensor, and (L) movement. If a sensor interface is used, it is preferably a CPLD configured to periodically scan (at random intervals, periodic intervals, or user defined intervals) the various sensors electrically associated with interface and transfer processed or unprocessed sensor signals to devices such as the processing device.

As noted above, the smart child safety device module is preferably electrically associated or integrated into a child safety device such as a child safety seat. The smart child safety device module is then paired with a local device or is configured with long-range medication capabilities. The smart child safety device module is configured to monitor a child associated with the child safety device as well as the environment in the vicinity of the child safety device. For example, the processing device may be configured to use the motion sensor to determine when a child is associated with the safety device. If the safety device is a child seat associated with a vehicle, and the processing device determines that there is no movement other than the movement of the child, that there are very few sounds other than the sounds being made by the child, and that temperature in the facility of the child safety seat is reaching dangerous levels, the processing device can be configured to execute various routines as described below.

Safe Baby Methods

Another important feature of a properly configured smart child safety device module associated with a child safety device relates to improved safety for infants. It seems that every year one hears of a parent that forgets a baby in the back seat of a car and the baby dies from exposure before the parent realizes what has happened. The smart child safety device module can be configured to greatly reduce the possibility of such an event by including an Infant Safety Routine.

For one embodiment, a voice sample of a particular infant crying is taken using the smart child safety device module's audio device and stored in memory. Alternatively, a standardized voice sample of an infant crying may be used. When the vehicle is parked, the smart child safety device module is configured to monitor the vehicles inside environment for sound. If sounds detected match the voice sample of the infant crying within a predefine threshold value, the smart child safety device module performs a Save-Baby Routine. Additionally, the smart child safety device module may be configured to use any one of the sensors and the sensor array to trigger a save baby routine. For example, as described above, the smart child safety device module's processing device may use a motion sensor and/or a pressure sensor to detect when an object (such as a baby) is in the child safety device and moving.

One exemplary Save-Baby routine includes the step of generating a baby-crying detection signal whenever sounds are detected that substantially match the voice sample of an infant crying. Alternatively, a motion sensor is monitored to determine if there is motion in the child safety device or a pressure sensor can be monitored to determine if there is weight above a predefined threshold in the baby seat. Next, a timer or counter may be activated that tracks how long the baby-crying detection signal is being generated. When the timer/counter reaches a predefined value, a forgotten-baby signal is generated. In addition to, or in lieu of, using a timer, once set a forgotten-baby signal may be generated based on any combination of sensor outputs as desired.

Upon generation of a forgotten-baby signal, the smart child safety device module may be programmed to perform a variety of tasks. First, the smart child safety device module may attempt to contact one or more users using predefined contact criteria such as phone numbers and e-mails addresses. The smart child safety device module may also use the audio module to record real time sound data to be transferred to a user. In addition, the module may be further configured to use the Imaging module to take images of the child safety device as well as the surrounding environment and transfer such images to a user. The smart child safety device module may further access the location finder (i.e. GPS) and retrieve location data and transfers such data to a user.

The smart child safety device module may be configured to monitor the baby's environment and take further steps to protect the baby including the following:

(1) If the temperature inside the vehicle is determined to be outside a predefined temperature range (an upper and lower temperature threshold values stored in memory), smart child safety device module starts the vehicle's engine and activates the vehicle's climate control system to maintain a predefined climate setting.

(2) The smart child safety device module may further monitor the CO2 levels inside the vehicle and if the CO2 level exceeds a predefined value, the vehicle's engine is shutoff and at least one window is "rolled down" to ventilate the car. When the CO2 levels return to a predefined acceptable level, the window(s) may be rolled back up and the car started as before to maintain an acceptable climate.

(3) When the timer/counter reaches a second predefined call-911 value, smart child safety device module contacts 911 and transmits an automatic message that may include any of the information described above, including the location data for the vehicle.

While the present subject matter has been described in detail with respect to specific embodiments thereof, it will be appreciated that those skilled in the art, upon attaining an understanding of the foregoing may readily adapt the present technology for alterations to, variations of, and equivalents to such embodiments. Accordingly, the scope of the present disclosure is by way of example rather than by way of limitation, and the subject disclosure does not preclude inclusion of such modifications, variations, and/or additions to the present subject matter as would be readily apparent to one of ordinary skill in the art.

What is claimed is:

1. A smart signal light for generating a motion signal, said smart signal light comprising:
   a housing;
   a power source disposed at least partially inside said housing and configured for supplying power;
   a motion sensor at least partially disposed in said housing and configured for generating motion-data;
   a signal generator disposed at least partially inside said housing, wherein said signal generator is electrically associated with said power source through a switching device and wherein said signal generator is configured for generating a motion signal;
   a processing device disposed inside said housing wherein said processing device is electrically associated with said switching element, said motion sensor, and said power source wherein said processing device is configured to generate a control-signal in response to said wherein said motion sensor is a motion detector and wherein said motion-data indicates at least one of
     (a) the smart signal light is slowing down,
     (b) the smart signal light is speeding up, and
     (c) the smart light is not accelerating; and
   wherein said motion signal is a visual signal, said signal generator is a display device, and wherein said control signal causes said display device to generate at least one of a first visual signal indication when said motion-data indicates the smart signal light is slowing down, a second visual signal indication when said motion-data indicates the smart signal light is speeding up, and a third visual signal indication when said motion-data indicates the smart signal light is not accelerating.

2. A smart signal light for generating a motion signal as in claim 1,
   wherein said control-signal is at least one of
     (a) modulated so that the switching device supplies modulated power to said display device thereby causing the display device to generate a flashing visual signal,
     (b) modulated to control the visual signal brightness, and
     (c) configured so that the switching device supplies a predefine power amplitude to the display device thereby controlling visual signal brightness.

3. A smart signal light for generating a motion signal as in claim 1,
   wherein said signal generator is at least one of
     (a) a display device comprising a light source,
     (b) a display device comprising at least one LED, and
     (c) a display device comprising at least one LCD display.

4. A smart signal light for generating a motion signal as in claim 1, wherein said control-signal causes the display device to generate light resulting in a first motion signal color when said sensor-data indicates the smart signal light is slowing down.

5. A smart signal light for generating a motion signal as in claim 4, wherein said control-signal causes the display device to generate light resulting in a second motion signal color when said sensor-data indicates the smart signal light is not slowing down.

6. A smart signal light for generating a motion signal as in claim 4, wherein said control-signal causes the display device to generate light resulting in a second motion signal color when said sensor-data indicates the smart signal light is speeding up.

7. A smart signal light for generating a motion signal as in claim 2, wherein said signal generator further comprises a sound generator and wherein said control-signal is configured to cause said sound generator to generate an acoustical signal.

8. A smart signal light for generating a motion signal as in claim 1, wherein said processing device is one of
   (a) a microchip,
   (b) an ASIC, and
   (c) an ASSP.

9. A smart signal light for generating a motion signal as in claim 1, wherein said housing is configured for being mechanically associated with clothes worn by a smart signal light user.

10. A smart signal light for generating a motion signal as in claim 1, wherein said housing is configured with a magnetic component configured for mechanically associating said housing with a ferromagnetic object and wherein said smart signal light is configured to perform a break light function.

11. A smart signal light for generating a motion signal, said smart signal light comprising:

a processing device, motion sensor, signal-generator and a power source wherein said processing device is electrically associated with said motion sensor and said signal-generator and wherein said power source is configured for suppling power to at least one of said processing device, said motion sensor, and said signal-generator;

wherein said motion sensor is configured for generating motion-data;

wherein said signal generator is configured for generating a motion signal wherein said motion signal comprises a visual signal;

wherein said processing device is configured for detecting said motion-data and activating said signal generator to generate said motion signal;

wherein said motion sensor is a motion detector and wherein said motion-data indicates at least one of (a) the smart signal light is slowing down, (b) the smart signal light is speeding up, and (c) the smart light is not accelerating; and wherein said signal generator is a display device and wherein said control signal causes said display device to generate at least one of (a) a first visual indication when said motion-data indicates the smart signal light is slowing down, (b) a second visual indication when said motion-data indicates the smart signal light is speeding up, and (c) a third visual indication when said motion-data indicates the smart signal light is not accelerating.

12. A smart signal light for generating a motion signal as in claim 11, wherein said motion sensor is an accelerometer.

13. A smart signal light for generating a motion signal as in claim 12, further comprising a focused-motion-signal-generator configured to generate a warning signal configured to be received by a remote device and wherein said processing device is a microchip that is configured to activate said focused-motion-signal-generator based at least in part on said motion-data.

14. A smart signal light for generating a motion signal as in claim 13, wherein said focused motion signal generator is at least one of (a) a light signal and (b) an RF signal.

15. A smart signal light for generating a motion signal as in claim 11, further comprising an acoustical signal generator configured for generating an acoustical signal in response to said control-signal.

16. A smart signal light for generating a motion signal as in claim 11, wherein said smart signal light is portable and configured to be associated with animal.

17. A smart signal light for generating a motion signal as in claim 11, wherein said smart signal light is portable and configured to be magnetically associated with at least one of a vehicle and a trailer.

18. A portable Smart Signal Generator (SSG) configured for generating a SSG-signal, said SSG comprising:

a housing configured for housing a processing device electrically associated with a motion sensor and wherein said processing device is further electrically associated with a display device;

a power source that is one of (a) disposed at least partially within said housing and (b) separate from said housing and wherein said power source is electrically associated with at least one of said processing device, said motion sensor, and said display device;

wherein said processing device is configured to monitor the output-signal generated by said motion sensor and activate said display device based at least in part on said output-signal;

wherein said housing is portable and configured for being associated with at least one of a vehicle and an animal;

wherein said motion sensor is a motion detector and wherein said output-signal indicates at least one of (a) the SSG is slowing down, (b) the SSG is speeding up, and (c) the SSG is not accelerating; and wherein said processing device causes said display device to generate at least one of (a) a first visual indication when said output-signal indicates the SSG is slowing down, a second visual indication when said output-signal indicates the SSG is speeding up, and a third visual indication when said output-signal indicates the SSG is not accelerating.

19. A portable SSG for generating a signal as in claim 18, wherein said animal is a human and wherein said display device comprises at least one of (a) at least one LED and (b) at least one LCD.

20. A portable SSG for generating a signal as in claim 19, wherein said signal is one of (a) a focused warning signal, (b) a break signal, and (c) a turn signal.

* * * * *